United States Patent
Saito et al.

(10) Patent No.: US 7,948,840 B2
(45) Date of Patent: May 24, 2011

(54) OPTICAL DISC DEVICE AND CONVERGING POSITION CORRECTION METHOD

(75) Inventors: Kimihiro Saito, Saitama (JP); Hirotaka Miyamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 380 days.

(21) Appl. No.: 12/131,333

(22) Filed: Jun. 2, 2008

(65) Prior Publication Data
US 2008/0316902 A1  Dec. 25, 2008

(30) Foreign Application Priority Data

Jun. 12, 2007 (JP) .............................. P2007-155283

(51) Int. Cl.
*G11B 7/00* (2006.01)
(52) U.S. Cl. .................................................. 369/44.29
(58) Field of Classification Search .................. None
See application file for complete search history.

(56) References Cited

U.S. PATENT DOCUMENTS

| | | | | |
|---|---|---|---|---|
| 5,892,739 | A * | 4/1999 | DeCusatis et al. | 369/44.13 |
| 7,542,396 | B2 * | 6/2009 | Terao et al. | 369/112.01 |
| 2001/0053118 | A1 * | 12/2001 | Yoshinari et al. | 369/275.2 |
| 2002/0009045 | A1 * | 1/2002 | Tsukagoshi et al. | 369/275.3 |
| 2004/0001400 | A1 * | 1/2004 | Amble et al. | 369/44.26 |
| 2005/0226134 | A1 | 10/2005 | Miyamoto | |
| 2006/0227670 | A1 * | 10/2006 | Terao et al. | 369/13.28 |
| 2006/0291360 | A1 * | 12/2006 | Maeda et al. | 369/53.23 |
| 2007/0121433 | A1 | 5/2007 | Nagura | |
| 2008/0137494 | A1 * | 6/2008 | Trautner et al. | 369/44.26 |
| 2008/0219109 | A1 * | 9/2008 | Maeda et al. | 369/44.14 |
| 2008/0316902 | A1 * | 12/2008 | Saito et al. | 369/112.23 |

FOREIGN PATENT DOCUMENTS

EP  1 734 515 A1  12/2006
WO  WO 01/78068 A2  10/2001

OTHER PUBLICATIONS

U.S. Appl. No. 12/272,179, filed Nov. 17, 2008, Saito, et al.

* cited by examiner

*Primary Examiner* — Peter Vincent Agustin
(74) *Attorney, Agent, or Firm* — Oblon, Spivak, McClelland, Maier & Neustadt, L.L.P.

(57) ABSTRACT

An optical disc device that irradiates an optical beam to an optical disc including a recording layer for recording information and a positioning layer provided with a track for identifying a recording position of the information on the recording layer, includes: objective lens that converges a predetermined positioning optical beam to adjust the optical beam to a desired track on the positioning layer and converges an information optical beam that shares an optical axis with the positioning optical beam on the recording layer; moving section that moves the objective lens in a tracking direction which is substantially orthogonal to the track to make a focal point of the positioning optical beam to follow the desired track; a detection section that detects a moving amount of the objective lens to the tracking direction; and correction section that corrects a converging position of the information optical beam in accordance with the moving amount.

13 Claims, 16 Drawing Sheets

104 SIGNAL RECORDING LAYER

104 SIGNAL RECORDING LAYER

OPTICAL DISC DEVICE AND CONVERGING POSITION CORRECTION METHOD

CROSS REFERENCES TO RELATED APPLICATIONS

The present invention contains subject matter related to Japanese Patent Application JP2007-155283 filed in the Japanese Patent Office on Jun. 12, 2007, the entire contents of which being incorporated herein by reference.

BACKGROUND OF THE INVENTION

1. Field of the Invention

The present invention relates to an optical disc device and a converging position correction method, and is suitably applied to, for example, an optical disc device.

2. Description of the Related Art

There has been widely used an optical disc device that is configured to reproduce information by irradiating an optical beam to an optical disc, such as a compact disc (CD), a digital versatile disc (DVD), and a Blu-ray disc (BD, a registered trademark), and reading reflected light of such an optical beam.

In addition, such an optical disc device records information by irradiating an optical beam to the optical disc and changing a local reflectivity and the like of the optical disc.

With respect to this optical disc, a size of an optical spot formed on the optical disc is obtained approximately by $\lambda/NA$ ($\lambda$: a wavelength of an optical beam, NA: numerical aperture) and resolution is proportional to this value. For example, details of a BD which is an optical disc with a diameter of 120 mm capable of recording data of about 25 GB are shown in Y. Kasami, Y. Kuroda, K. Seo, O. Kawakubo, S. Takagawa, M. Ono, and M. Yamada, Jpn. J. Appl. Phys., 39, 756 (2000).

An optical disc records a variety of information, such as various contents including a music content and a video content, or various data for computer. In particular, in recent years, an amount of information has increased due to higher definition of video, higher sound quality of music, and the like, and increase in the number of contents to be recorded in one optical disc has been requested. Accordingly, the optical disc has been requested to have further increased capacity.

In view of the above, there has been suggested a method that increases recording capacity of one optical disc by superposing recording layers in one optical disc (for example, refer to I. Ichimura et al, Technical Digest of ISOM' 04, pp 52, Oct. 11-15, 2005, Jeju Korea).

On the other hand, there also has been suggested an optical disc device using a hologram as a recording method of information on an optical disc (for example, refer to R. R. McLeod et al., "Microholographicmultilayer optical disc data storage," Appl. Opt., Vol. 44, 2005, pp 3197).

For example, as shown in FIG. 1, an optical disc device 1 once converges an optical beam from an optical head 7 in an optical disc 8 made of photopolymer or the like in which a refractive index changes depending on optical intensity of irradiated light. Then, the optical disc device 1 uses a reflection device 9 provided on a back surface side (a lower side in FIG. 1) of the optical disc 8 to converge an optical beam on the same conversing position again from an opposite direction.

The optical disc device 1 emits an optical beam made up with laser light from a laser 2, modulates a light wave of the optical beam at an acousto-optical modulator 3, and converts the optical beam to parallel light by a collimator lens 4. Then, the optical beam passes through a polarization beam splitter 5, the optical beam linearly polarized is converted to be circularly polarized light at a quarter wavelength plate 6, and then is incident on the optical head 7.

The optical head 7 is configured to be able to record and reproduce information. The optical head 7 reflects the optical beam at a mirror 7A, converges the beam by using an objective lens 7B, and irradiates the beam to the optical disc 8 which is rotated by a spindle motor (not shown).

At this time, the optical beam is once focused in the inside of the optical disc 8, and then the optical beam is reflected by the reflection device 9 arranged on a back surface side of the optical disc 8, and is converged at the same converging point in the inside of the optical disc 8 from the back surface side of the optical disc 8. The reflection device 9 is configured with a converging lens 9A, a shutter 9B, a converging lens 9C, and a reflection mirror 9D.

At a result, as shown in FIG. 2A, a standing wave is generated at the converging position of the optical beam, and a recording mark RM made up with small holograms of an optical spot size is formed. The recording mark RM has an entire shape as though two cones are adhered to each other on the bottom surfaces thereof. In this manner, the recording mark RM is recorded as information.

The optical disc device 1 records a plurality of the recording marks RM in the inside of the optical disc 8 by rotating the optical disc 8 and arranging each of the recording marks RM concentrically or along a spiral track so as to form one mark recording layer. Further, the optical disc device 1 adjusts a converging position of the optical beam so as to be able to record each of the recording marks RM in a manner that a plurality of the mark recording layers are superposed.

In the above manner, the optical disc 8 has a multi-layer structure having a plurality of the mark recording layers in the inside. For example, as shown in FIG. 2B, in the optical disc 8, a distance (a mark pitch) p1 between the recording marks RM is 1.5 $\mu$m, a distance (a track pitch) p2 between tracks is 2 $\mu$m, and a distance p3 between layers is 22.5 $\mu$m.

In addition, in case information is reproduced from the disc 8 on which the recording mark RM is recorded, the optical disc device 1 closes the shutter 9B of the reflection device 9 so as not to radiate the optical beam from the back surface side of the optical disc 8.

At this time, the optical disc device 1 irradiates an optical beam to the recording mark RM in the optical disc 8 by using the optical head 7, and emits a reproduction optical beam generated from the recording mark RM to the optical head 7. The reproduction optical beam which is circularly polarized is converted to be linearly polarized at the quarter wavelength plate 6, and reflected by the polarization beam splitter 5. Further, the reproduction optical beam is converged by a converging lens 10, and irradiated to a photodetector 12 through a pinhole 11.

At this time, the optical disc device 1 detects a light amount of the reproduction optical beam at the photodetector 12, and reproduces information based on a result of the detection.

In addition, there has been suggested an optical disc device that uses different kinds of optical beams between position control of an objective lens and recording and reproduction of information (for example, refer to S-K Park, T. D. Milster, T. M. Miller, J. Buts and W. Bletscher, Jpn. J. Appl. Phys., Vol. 44 (2005) pp. 3442-3444).

For example, as shown in FIG. 3, an optical disc device 15 irradiates a position control optical beam L1 to an optical disc 18 through a beam splitter 16 and an objective lens 17.

In addition, the optical disc device 15 detects return light obtained by the position control optical beam L1 reflected on a reflection surface 18A of the optical disc 18, carries out position control, such as focus control and tracking control of the objective lens 17 in accordance with a result of the detection, and focuses the position control optical beam L1 at a desired track of the reflection surface 18A.

In this state, the optical disc device 15 reflects a recording and reproduction optical beam L2 which is different from the position control optical beam L1 by using the beam splitter 16, focuses the optical beam L2 on a recording layer 18B of the optical disc 18 through the objective lens 17 which is position-controlled, and in this manner carries out recording or reproduction of information (the recording mark RM and the like).

SUMMARY OF THE INVENTION

As shown in FIG. 3, the optical disc device 15 converges the position control optical beam L1 and the recording and reproduction optical beam L2 made up with converging light or diverging light by using the objective lens 17.

At this time, as shown in FIG. 4A showing part of FIG. 3 in an enlarging manner, the objective lens 17 converges the position control optical beam L1 to a focal point F1 by a converging effect in case an original focal point of the position control optical beam L1 is a focal point P1. In addition, as shown in FIG. 4A and FIG. 4B, the objective lens 17 converges the recording and reproduction optical beam L2 to a focal point F2 in case a focal point of the recording and reproduction optical beam L2 which is converging light is a focal point P2.

Here, assuming that a converging distance of the objective lens 17 is f and distances from an optical reference line LS of the objective lens to the points P1, F1, P2, and F2 are r1, s1, r2, and s2, respectively, relationships of formulas (1) and (2) shown below are established.

$$\frac{1}{s1} + \frac{1}{r1} = \frac{1}{f} \quad (1)$$

$$\frac{1}{s2} + \frac{1}{r2} = \frac{1}{f} \quad (2)$$

As shown in FIG. 4A, the optical disc device 15 is designed with reference to a state in which an optical axis C of the objective lens 17 is superposed on an optical axis A1 of the position control optical beam L1 and an optical axis A2 of the recording and reproduction optical beam L2 (hereinafter, a position of the objective lens 17 in this state is referred to as the reference position).

As shown in FIG. 5 which shows FIGS. 4A and 4B in a superposing manner, when the objective lens 17 is on the reference position, the optical disc device 15 positions both the focal point F1 of the position control optical beam L1 and the focal point F2 of the recording and reproduction optical beam L2 on the center axis C.

That is, the optical disc device 15 positions the focal point F2 directly below the focal point F1 when viewed from the objective lens 17 side. Based on such a positional relationship, the focal point F1 is adjusted to a desired track so that the focal point F2 can be adjusted to a desired position.

However, when tracking control is carried out so as to control the focal point F1 of the position control optical beam L1 to follow a desired track of the optical disc 18, the objective lens 17 is moved from the reference position.

Here, as shown in FIG. 6 which corresponds to FIG. 5, the objective lens 17 is assumed to be moved in a direction of an arrow a. In this case, both the optical axes A1 and A2 of the position control optical beam L1 and the recording and reproduction optical beam L2 which are converging light are deviated from the center axis of the objective lens 17, and therefore are refracted by the objective lens 17.

With such refraction of the optical axes A1 and A2, both the focal point F1 of the position control optical beam L1 and the focal point F2 of the recording and reproduction optical beam L2 move to the direction of the arrow a or a direction opposite thereto, that is, a tracking direction, and are focused at a focal point F1m and a focal point F2m.

At this time, distances from the focal points F1m and F2m to the reference line LS of the objective lens 17 are different from each other. Therefore, moving amounts of the focal points F1 and F2 with respect to the tracking direction are different from each other for a deviation amount gm.

That is, in case the objective lens 17 is moved from the reference position in the tracking direction, the optical disc device 15 is not able to be adjusted to the focal point F2 of the recording and reproduction optical beam L2 with a desired position since a positional relationship in which "the focal point F2 is positioned directly below the focal point F1" is disturbed, and therefore accuracy of recording and reproduction may be lowered.

The present invention has been made in view of the above, and proposes an optical disc device that can improve recording and reproduction accuracy of information when an objective lens is moved in a tracking direction, and a converging position correction method that can adjust a focal point of an optical beam to a target position with high accuracy.

In order to achieve the above object, according to an aspect of the present invention, there is provided an optical disc device that irradiates an optical beam to an optical disc including a recording layer for recording information and a positioning layer provided with a track for identifying a recording position of the information on the recording layer, including: an objective lens that converges a predetermined positioning optical beam so as to adjust the optical beam to a desired track on the positioning layer, and also converges an information optical beam that shares an optical axis with the positioning optical beam on the recording layer; a moving section that moves the objective lens in a tracking direction which is substantially orthogonal to the track to make a focal point of the positioning optical beam to follow the desired track; a detection section that detects a moving amount of the objective lens with respect to the tracking direction; and a correction section that corrects a converging position of the information optical beam in accordance with the moving amount.

In this manner, a deviation can be dissolved between converging positions of a positioning optical beam and information optical beam with respect to a tracking direction when an objective lens moves in the tracking direction.

In addition, according to another aspect of the present invention, there is provided a converging position correction method of when irradiating an optical beam to an optical disc including a recording layer for recording information and a positioning layer provided with a track for identifying a recording position of the information on the recording layer, including: a moving step for moving an objective lens that converges a predetermined positioning optical beam so as to adjust the optical beam to a desired track on the positioning layer, and also converges an information optical beam that shares an optical axis with the positioning optical beam on the recording layer, in a tracking direction which is substantially orthogonal to the track; a detection step for detecting a moving amount of the objective lens with respect to the tracking direction; and a correction step for correcting a converging position of the information optical beam in accordance with the moving amount so as to make a focal point of the positioning optical beam following the desired track.

In this manner, a deviation can be dissolved between converging positions of a positioning optical beam and information optical beam with respect to a tracking direction when an objective lens moves in the tracking direction.

According to the present invention, a deviation can be dissolved between converging positions of a positioning optical beam and information optical beam with respect to a tracking direction when an objective lens moves in the tracking direction. In this manner, an optical disc device that can improve recording and reproduction accuracy of information when an objective lens is moved in a tracking direction, and a converging position correction method that can adjust a focal point of an optical beam to a target position with high accuracy can be realized.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Hereinafter, embodiments of the present invention will be described in detail with respect to the accompanying drawings.

(1) First Embodiment

(1-1) Entire Configuration of Optical Disc Device

Figure 7:
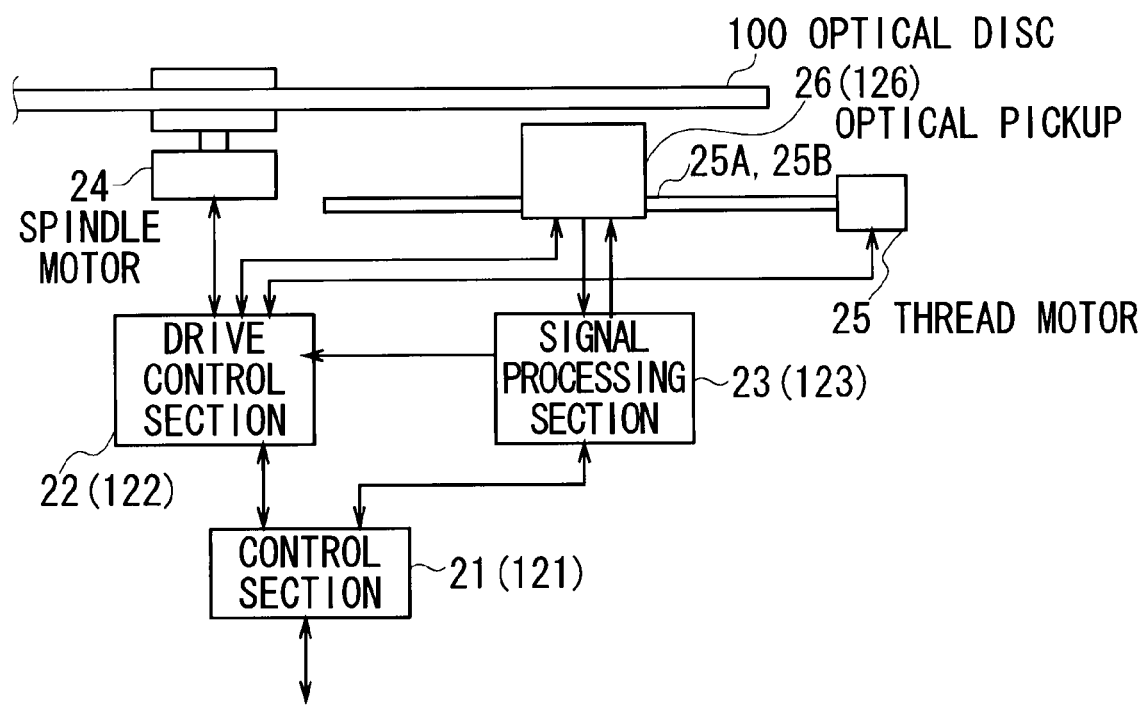
FIG. 7 is a schematic diagram showing a configuration of an optical disc device according to an embodiment of the present invention.

As shown in FIG. 7, an optical disc device 20 is configured to record and reproduce information after carrying out tracking control and focus control by irradiating an optical beam to an optical disc 100.

The optical disc device 20 uses a control section 21 to totally control an entire device. The control section 21 is configured with a central processing unit (CPU) (not shown) as a main constituent, and executes a variety of processing, such as information recording processing, by reading out a variety of programs, such as a basic program and an information recording program, from a read only memory (ROM) (not shown), and expanding the readout program in a random access memory (RAM) (not shown).

For example, when the control section 21 receives a command for recording information, information to be recorded, and recording address information from an external device or the like (not shown) in a state the optical disc 100 is mounted, the control section 21 supplies a driving command and the recording address information to a drive control section 22 and also supplies the recording information to a signal processing section 23.

On a recording layer 101 of the optical disc 100, a track having a spiral shape or a concentric shape is formed and also an address for specifying a position of the track is appropriately allocated. The recording address information is information that track) on which information is to be recorded or reproduced.

The drive control section 22 is, as similar to the control section 21, configured with a CPU (not shown) as a main constituent, and executes a variety of processing, such as information recording processing, by reading out a variety of programs, such as an information recording program, from a ROM (not shown), and expanding the readout program in a RAM (not shown).

The drive control section 22 controls drive of a spindle motor 24 in accordance with a drive command to rotate the optical disc 100 *w* a predetermined rotating speed, and also controls drive of a thread motor 25 to move an optical pickup 26 to a position corresponding to recording address information in a track direction (that is, an inner track direction or an outer track direction) of the optical disc 100 along a moving axes 25A and 25B.

The signal processing section 23 applies a variety of signal processing, such as predetermined encoding processing and modulation processing, to the supplied information to be recorded to generate a recording signal, and supplies the recording signal to the optical pickup 26.

The optical pickup 26 carries out focus control and tracking control based on control of the drive control section 22 to adjust a irradiation position of optical beam to a track formed on the recording layer 101 of the optical disc 100, so as to record a recording mark RM corresponding to a recording signal from the signal processing section 23. Detailed description thereof will be made below.

In addition, when the control section 21 receives, for example, an information reproduction command and reproduction address information showing an address of the information to be recorded from an external device (not shown), the control section 21 supplies a drive command to the drive control section 22, and also supplies a reproduction processing command to the signal processing section 23.

As similar to a case of recording information, the drive control section 22 controls drive of the spindle motor 24 to rotate the optical disc 100 at a predetermined rotational speed, and also controls drive of the thread motor 25 to move the optical pickup 26 to a position corresponding to the reproduction address information.

The optical pickup 26 carries out focus control and tracking control based on control of the drive control section 22 to adjust a irradiation position of optical beam to a track (that is, the target track) shown by the reproduction address information on the recording layer 101 of the optical disc 100, and radiate an optical beam of a predetermined light amount. At this time, the optical pickup 26 detects a reproduction optical beam generated from the recording mark RM on the recording layer 101 of the optical disc 100, and supplies a detection signal corresponding to a light amount of the reproduction optical beam (details will be described later).

The signal processing section 23 applies a variety of signal processing, such as predetermined demodulation processing and decoding processing, to the supplied detection signal to generate reproduction information, and supplies the reproduction information to the control section 21. In response to such supply of the reproduction information, the control section 21 sends out the reproduction information to an external device (not shown).

The optical disc device 20 uses the control section 21 to control the optical pickup 26 in the above manner so as to record information on the target track on the recording layer 101 of the optical disc 100 and reproduce information from the target track.

(1-2) Configuration of Optical Pickup

Figure 8:
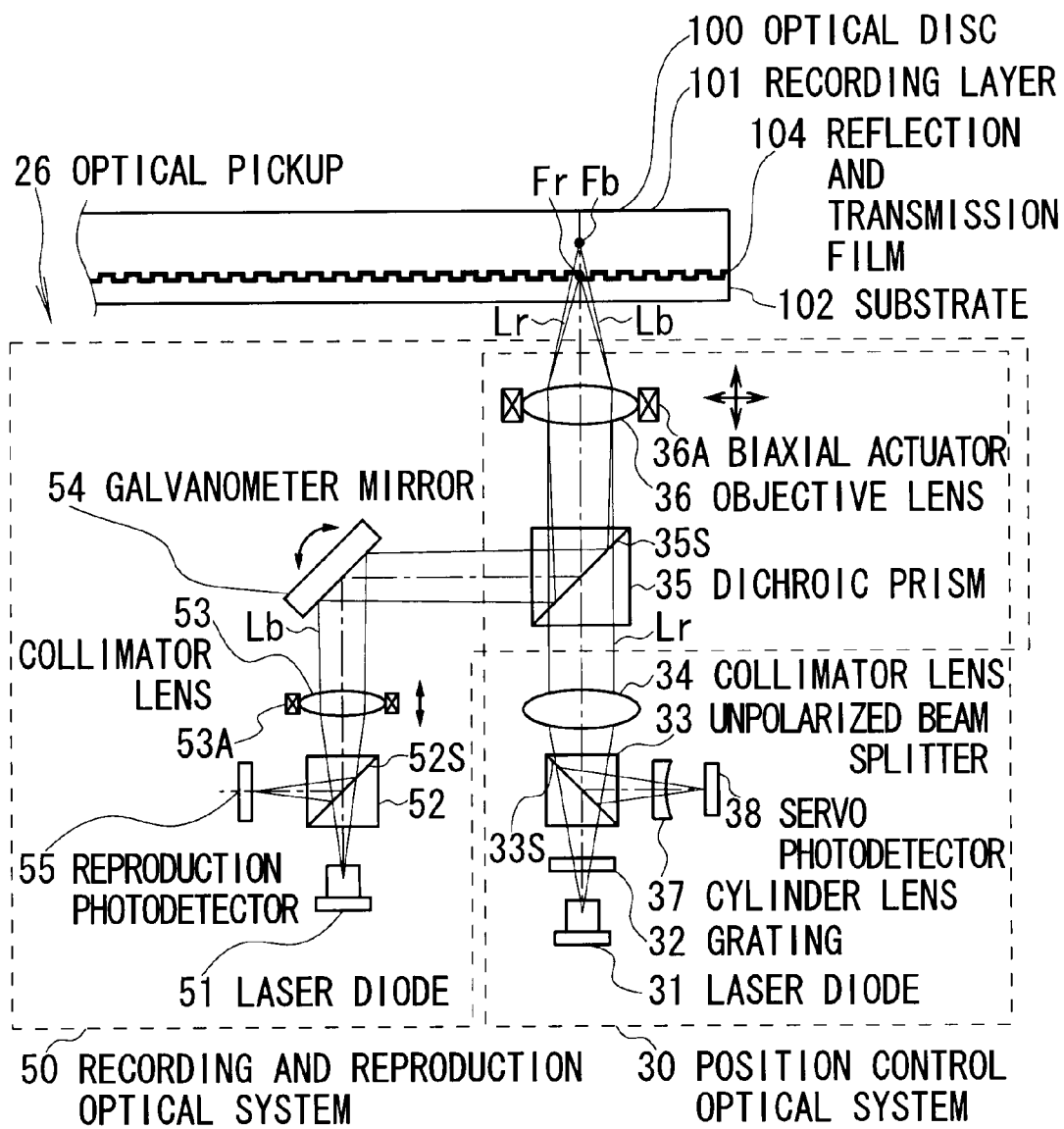
FIG. 8 is a schematic diagram showing a configuration of the optical pickup according to a first embodiment.

As shown in FIG. 8, the optical pickup 26 is roughly configured with a position control optical system 30 that controls a position of an objective lens 36 and a recording and reproducing optical system 50 that records and reproduces information on and from the optical disc 100.

(1-2-1) Configuration of Position Control Optical System

Based on a control command from the drive control section 22 (FIG. 7), a laser diode 31 of the position control optical system 30 emits a red optical beam Lr1 as a positioning optical beam made up of diverging light with a wavelength of about 660 nm to be incident on a grating 32.

The grating 32 is provided with a diffraction grating (not shown). The grating 32 divides the red optical beam Lr1 to a main optical beam Lr1A for tracking control and sub optical beams Lr1B and Lr1C by a grating effect of the diffraction grating, and allows all of such optical beams to be incident on an unpolarized beam splitter 33.

The main optical beam Lr1A and the sub optical beams Lr1B and Lr1C are in a state where an angle of an optical axis (not shown) of each of the optical beams is slightly different from each other, and advance through similar optical paths. Hereinafter, for convenience of description, the main optical beam Lr1A and the sub optical beams Lr1B and Lr1C are collectively referred to as the red optical beam Lr1.

The unpolarized beam splitter 33 transmits the red optical beam Lr1 in a predetermined proportion to be incident on a collimator lens 34. The collimator lens 34 converts the red optical beam Lr1 to parallel light and allows the red optical beam Lr1 to be incident on a dichroic prism 35.

A reflection and transmission surface 35S of the dichroic prism 35 has a wavelength selectivity. The reflection and transmission surface 35S transmits a red optical beam having a wavelength of about 660 nm in a proportion of about 100%, and reflects a blue optical beam having a wavelength of about 405 nm in a proportion of about 100%. For this reason, the dichroic prism 35 transmits the red optical beam Lr1 on the reflection and transmission surface 35S to be incident on the objective lens 36.

The objective lens 36 converges the red optical beam Lr1 to be incident on the optical disc 100. As shown in a cross-sectional view shown in FIG. 9, the optical disc 100 is configured with the recording layer 101 for recording information and a substrate 102 which are put together, and a reflection and transmission film 104 working as a positioning layer at a boundary surface thereof in a manner sandwiched by the recording layer 101 and the substrate 102. For convenience of description, in FIG. 9, the optical pickup is shown upside down from the view of FIG. 8.

The substrate 102 is made of a material, such as polycarbonate and glass, and transmits light incident from one surface to an opposite surface with high transmittance. Further, the substrate 102 has strength of a certain extent. Therefore, the substrate 102 maintains an entire shape of the optical disc 100.

Figure 1:
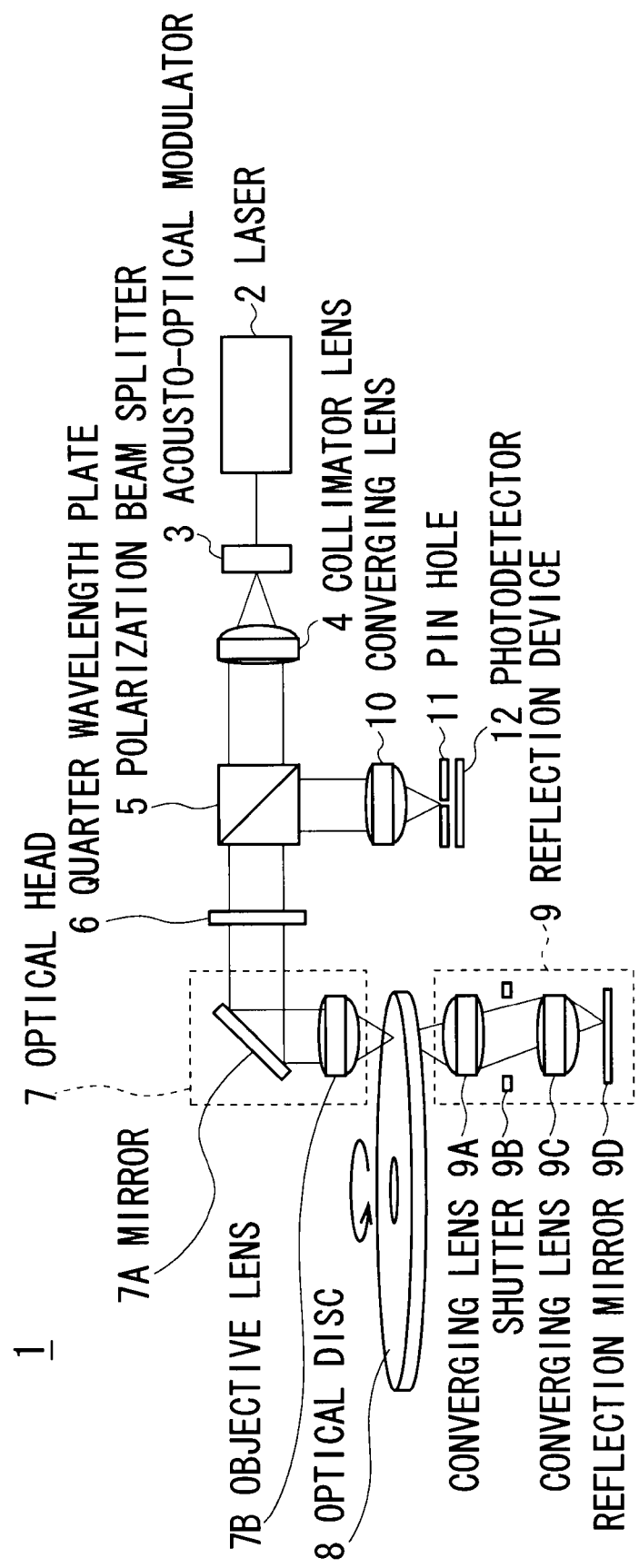
FIG. 1 is a schematic diagram showing a configuration of a known optical disc device of a standing wave recording type.
Figure 2A:
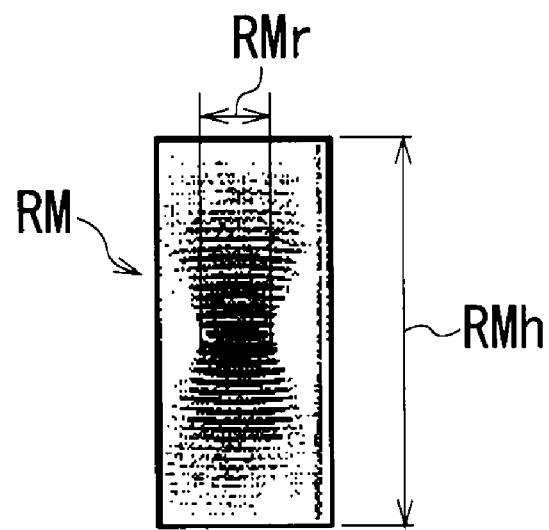
FIGS. 2A and 2B are schematic diagrams showing hologram formation.
Figure 2B:
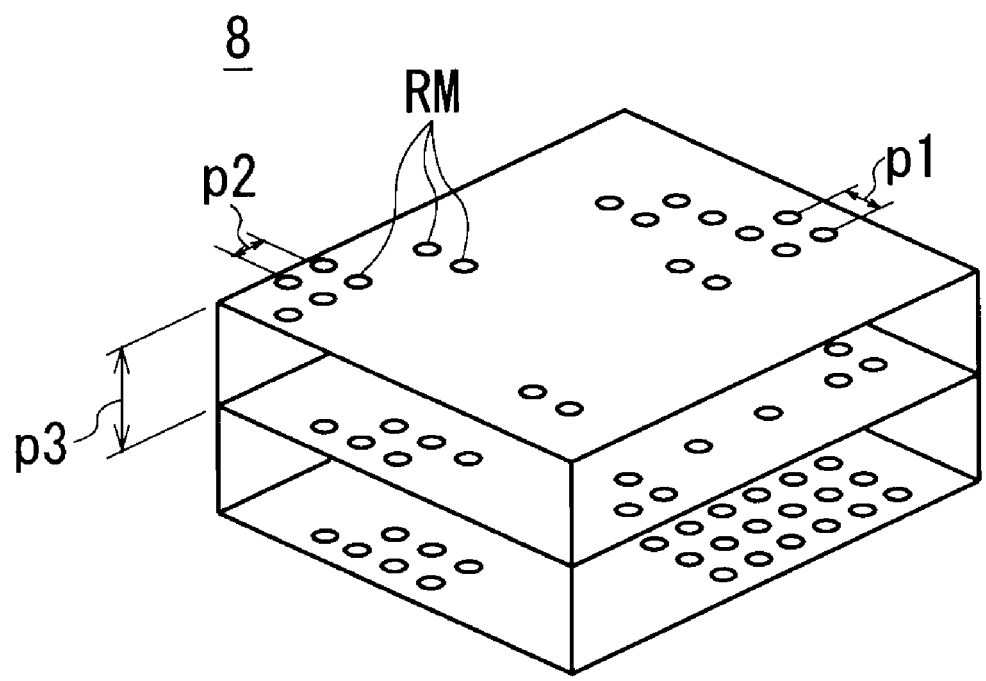
Figure 3:
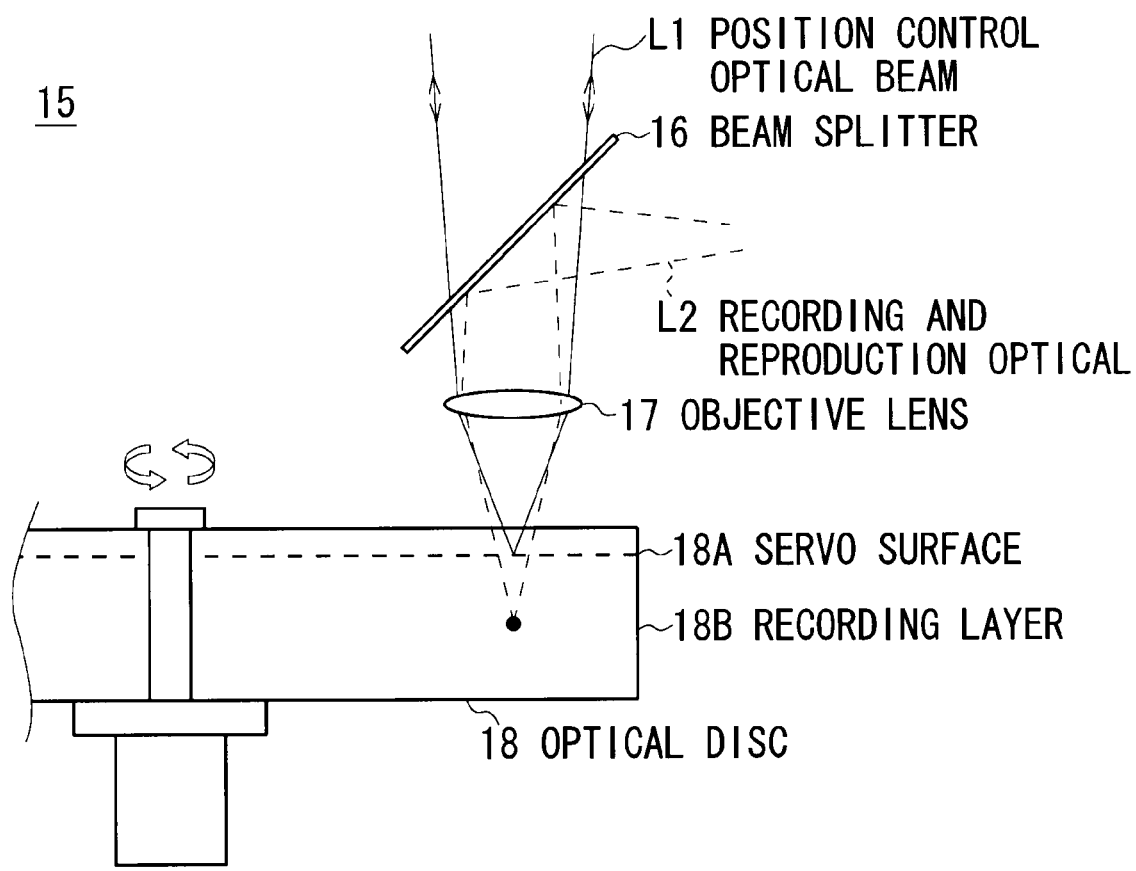
FIG. 3 is a schematic diagram showing a configuration of an optical disc device using two types of optical beams.

The recording layer 101 is made of photopolymer or the like which has a refractive index varying depending on intensity of irradiated light as similar to the optical disc 8 (FIG. 1) and the recording medium M (FIG. 7), and responds to a blue optical beam having a wavelength of 405 nm.

In actuality, the optical disc 100 has a blue optical beam Lb1, which is converged by the objective lens 36, irradiated thereon at the times of recording and reproducing information (details will be described below).

The reflection and transmission film 104 working as a reflection and transmission layer is made of a dielectric multilayer film or the like. The reflection and transmission film 104 has a wavelength selectivity that transmits a blue optical beam having a wavelength of 405 nm and reflects the red optical beam Lr1 having a wavelength of 660 nm.

In addition, the reflection and transmission film 104 has a guide groove for a tracking servo formed thereon. More specifically, a spiral track is formed by a land and a groove similar to a general recordable BD (BD-R) disc and the like. This track is added with an address having a series of numbers for each predetermined recording unit. Such an address allows identification of a track for recording or reproducing information.

The reflection and transmission film 104 (that is, a boundary surface between the recording layer 101 and the substrate 102) may have a pit or the like formed thereon in place of the guide groove, or may have a combination of the guide groove and a pit or the like. In short, the reflection and transmission film 104 only needs to recognize an address based on reflected light of an optical beam.

Figure 10:
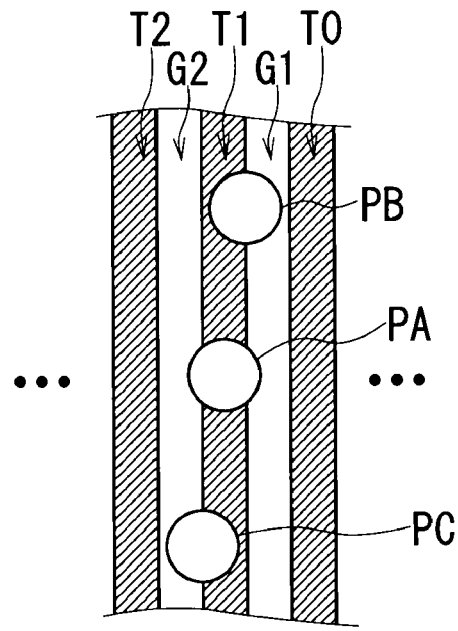
FIG. 10 is a schematic diagram showing a state of a beam spot according to the first embodiment.

The objective lens 36 converges each of three optical beams, that is, the main optical beam Lr1A and the sub optical beams Lr1B and Lr1C, configuring the red optical beam Lr1. In this manner, as shown in FIG. 10, the objective lens 36 forms beam spots PA, PB, and PC on the reflection and transmission film 104 of the optical disc 100, respectively.

At this time, due to an effect of the grating 32, the beam spots PB and PC are formed at positions shifted to left and right for a quarter track width from the beam spot PA with respect to a tracking direction orthogonal to a running direction of a track T1.

In addition, the main optical beam Lr1A and the sub optical beams Lr1B and Lr1C are reflected on the reflection and transmission film 104 of the optical disc 100 to become a main reflected light beam Lr2A and sub reflected beams Lr2B and Lr2C, respectively, and advance through an optical path of the red optical beam Lr1 in an opposite direction. Hereinafter, for convenience of description, the main reflected optical beam Lr2A and the sub reflected optical beams Lr2B and Lr2C will be collectively referred to as the red reflected optical beam Lr2.

The objective lens 36 converts the red reflected optical beam Lr2 from diverging light to parallel light, and allows the red reflected optical beam Lr2 to be incident on the collimator lens 34 through the dichroic prism 35. The collimator lens 34 converts the red reflected optical beam Lr2 to converging light to be incident on the unpolarized beam splitter 33.

The unpolarized beam splitter 33 reflects part of the red reflected optical beam Lr2, and then a cylinder lens 37 applies astigmatism to the reflected optical beam. After that, the red reflected optical beam Lr2 is irradiated on a servo photodetector 38.

Figure 11:
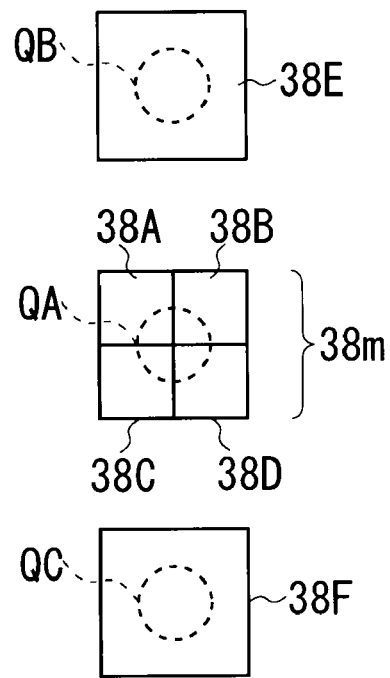
FIG. 11 is a schematic diagram showing a detection area of a servo photo detector according to the first embodiment.

As shown in FIG. 11, the servo photodetector 38 includes detection areas 38A, 38B, 38C, and 38D which are obtained by dividing a main detection area 38m into four areas in a grid-like manner. In addition, the servo photodetector 38 includes detection areas 38E and 38F that face each other with the main detection area 38m located therebetween, and are formed at positions somewhat away from the main detection area 38m.

The main detection area 38m and the detection areas 38E and 38F each are irradiated with three optical beams, that is, the main reflected optical beam Lr2A and the sub reflected optical beams Lr2B and Lr2C, configuring the red reflected optical beam Lr2, and in this manner beam spots QA, QB, and QC are formed, respectively.

The optical pickup 26 is configured so that irradiation states, that is, forming positions, sizes, light amounts, and the like, of the beam spots QA, QB, and QC (FIG. 10) vary in accordance with irradiation states of the main optical beam Lr1A and the sub optical beams Lr1B and Lr1C with respect to the reflection and transmission film 104 of the optical disc 100, that is, forming positions, converging states, and the like of the beam spots PA, PB, and PC with respect to the track T1 (FIG. 9), depending on allocation of optical members.

The servo photodetector 38 detects part of the main reflected optical beam Lr2A at each of the detection areas 38A to 38D, and generates detection signals SDA, SDB, SDC, and SDD, respectively, in accordance with light amounts detected at this time. Then, the servo photodetector 38 sends out such detection signals to the signal processing section 23 (FIG. 7).

In addition, the servo photodetector 38 detects the sub reflected optical beams Lr2B and Lr2C at the detection areas 38E and 38F, respectively, and generates detection signals SDE and SDF, respectively, in accordance with light amounts detected at this time. Then, the servo photodetector 38 sends out such detection signals to the signal processing section 23 (FIG. 7).

The signal processing section 23 uses a so-called astigmatism method to calculate a focus error signal SFE in accordance with the following formula (3), and supplies the focus error signal SFE to the drive control section 22 (FIG. 7).

$$SFE = (SDA + SDD) - (SDB + SDC) \quad (3)$$

The focus error signal SFE expresses a degree of a deviation amount in a focus direction (that is, a direction of becoming closer to or far way from the optical disc 100) between the reflection and transmission film 104 of the optical disc 100 and the focal point Fr of the main optical beam Lr1A, due to the above-described allocation of optical members in the optical pickup 26.

In addition, the signal processing section 23 uses a so-called three-spot method to calculate a three-spot tracking error signal STE3 in accordance with the following formula (4), and supplies the three-spot tracking error signal STE3 to the drive control section 22 (FIG. 7).

$$STE3 = SDE - SDF \quad (4)$$

The three-spot tracking error signal STE3 expresses a degree of a deviation amount in a tracking direction (that is, a direction to an inner track or an outer track of the optical disc 100) between the target track of the reflection and transmission film 104 of the optical disc 100 and the focal point Fr of the main optical beam Lr1A, due to the above-described allocation of optical members in the optical pickup 26.

The drive control section 22 generates a focus control signal DF based on the focus error signal SFE, and also generates a tracking control signal DT based on the three-spot tracking error signal SET3. Then, the drive control section 22 supplies the focus control signal DF and the tracking control signal DT to a biaxial actuator 36A (FIG. 8) of the optical pickup 26.

The biaxial actuator 36A carries out so-called focus control, in which the biaxial actuator 36A drives the objective lens 36 in a focus direction based on the focus control signal DF. In this manner, a deviation amount with respect to the focus direction between the target track and the focal point Fr of the main optical beam Lr1A is reduced.

In addition, the biaxial actuator 36A carries out so-called tracking control, in which the biaxial actuator 36A drives the objective lens 36 in a tracking direction based on the tracking control signal DT. In this manner, a deviation amount (hereinafter referred to as the track deviation amount) in the tracking direction between the target track and the main optical beam Lr1A is reduced.

As described above, the drive control section 22 carries out feedback control of the objective lens 36 in the focus direction and the tracking direction based on the focus error signal SFE and the three-spot tracking error signal STE3. In this manner, the focal point Fr of the main optical beam Lr1A is allowed to focus on and follow the target track on the reflection and transmission film 104 of the optical disc 100.

(1-2-2) Configuration of Recording and Reproduction Optical System

On the other hand, for example, in case information is to be recorded on the optical disc 100, a laser diode 51 of the recording and reproduction optical system 50 emits the blue optical beam Lb1 as information optical beam made up with diverging light having a wavelength of 405 nm based on a control command from the drive control section 22 (FIG. 7), and the blue optical beam Lb1 is made incident on an unpolarized beam splitter 52.

The unpolarized beam splitter 52 transmits the blue optical beam Lb1 in a predetermined proportion to be incident on a collimator lens 53. The collimator lens 53 adjusts a diverging angle of the blue optical beam Lb1 and then a mirror surface 54S of a galvanometer mirror 54 reflects the blue optical beam Lb1. In this manner, the blue optical beam Lb1 is incident on the dichroic prism 35.

The dichroic prism 35 uses a reflection and transmission surface 37S to reflect the blue optical beam Lb1 in accordance with a wavelength of the blue optical beam Lb1 to allow the blue optical beam Lb1 to be incident on the objective lens 36.

A position of the objective lens 36 is controlled by the focus control described above, so that the focal point Fr of the red optical beam Lr1 made up with parallel light is allowed to be adjusted to the target track on the reflection and transmission film 104. For this reason, the objective lens 36 focuses the blue optical beam Lb1 made up with diverging light in the recording layer 101 of the optical disc 100 which is farther than the target track.

The recording layer 101 of the optical disc 100 is configured with photopolymer or the like that reacts to, for example, a blue optical beam having a wavelength of 405 nm and has a refractive index varying depending on intensity of irradiated light.

Figure 12A:
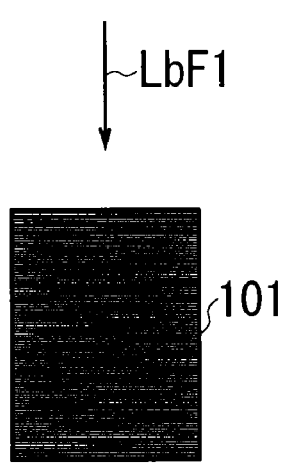
FIGS. 12A to 12C are schematic diagrams showing a principle of recording and reproduction of a hologram.

As shown in FIG. 12A, the recording layer 101 has a hologram uniformly formed thereon in a manner that blue optical beams LbF1 and LbF2 for formatting having a wavelength of 405 nm are irradiated on the entire recording layer 101 from two opposite directions, for example, directions of both surfaces of the optical disc 100, in format processing carried out in advance.

Figure 12B:
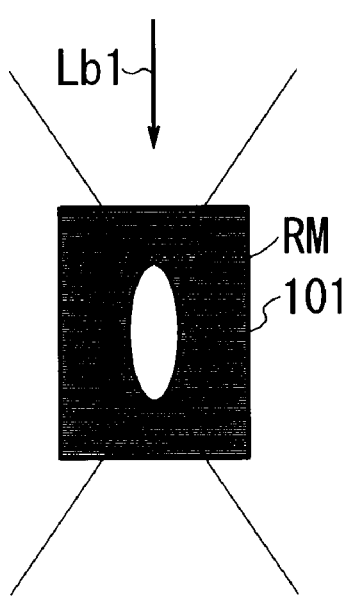

In case the blue optical beam Lb1 is irradiated and converged in a predetermined intensity, a hologram is partly destroyed by the blue optical beam Lb1, and as shown in FIG. 12B, the recording mark RM made up with the part at which the hologram is destroyed is formed on the recording layer 101.

Figure 12C:
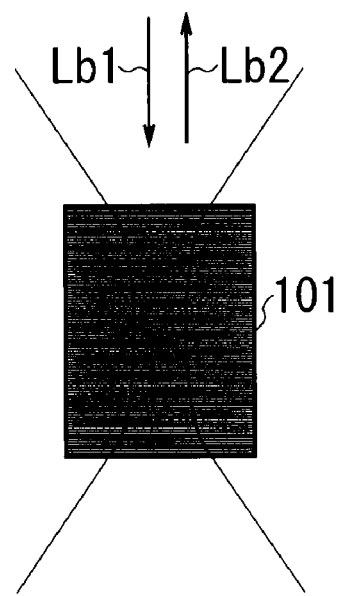

In this case, as shown in FIG. 12C, in case the blue optical beam Lb1 having the same wavelength as that at the time of formatting is irradiated on a location where the recording mark RM is not formed, the recording layer 101 has a reproduction optical beam Lb2 generated from the location irradiated by the blue optical beam Lb1 due to a characteristic of a hologram.

On the other hand, since part of the hologram where the recording mark RM is recorded is destroyed, even if the blue optical beam Lb1 is irradiated on that location, the recording layer 101 does not show the characteristic of a hologram and does not have the reproduction optical beam Lb2 generated at that location.

In view of the above, the recording layer 101 can record and reproduce information, in a manner that, for example, values "0" and "1" showing the information in binary numbers are allocated to "recording mark RM does not exist (that is, the hologram is not destroyed)" and "recording mark RM exists (that is, the hologram is destroyed)", respectively.

That is, in case an intensity of the blue optical beam Lb1 is comparatively high, the recording layer 101 has the recording mark RM recorded as information at a position of the focal point Fb of the blue optical beam Lb1. In addition, in case an intensity of the blue optical beam Lb1 is comparatively low, and a hologram is formed at a position of the focal point Fb of the blue optical beam Lb1, the recording layer 101 has the reproduction optical beam Lb2 generated, and allows the reproduction optical beam Lb2 to be incident on the objective lens 36.

The reproduction optical beam Lb2 has its diverging angle (or converging angle) converted by the objective lens 36. After that, the reproduction optical beam Lb2 is serially reflected by the reflection and transmission surface 35S of the dichroic prism 35 and the galvanometer mirror 54, and then allowed to be incident on the collimator lens 53.

The collimator lens 53 converges the reproduction optical beam Lb2 to allow the reproduction optical beam Lb2 to be incident on the unpolarized beam splitter 52. The unpolarized beam splitter 52 reflects the reproduction optical beam Lb2 by using the reflection and transmission surface 52S in accordance with a polarizing direction of the reproduction optical beam Lb2, and then irradiates the reproduction optical beam Lb2 on a photodetector 55.

The photodetector 55 detects a light amount of the reproduction optical beam Lb2, and generates a reproduction detection signal SDp in accordance with the light amount detected at this time. Then, the photodetector 55 supplies the reproduction detection signal SDp to the signal processing section 23 (FIG. 7). In accordance with the above, the signal processing section 23 applies predetermined demodulation processing, decoding processing, and the like to the supplied reproduction detection signal SDp to generate reproduction information, and supplies the reproduction information to the control section 21.

The drive control section 22 (FIG. 7) controls an actuator 53A to move the collimator lens 53 to an optical axis direction of the blue optical beam Lb1. In this manner, the drive control section 22 can adjust a diverging angle of the blue optical beam Lb1 to be incident on the objective lens 36 and a distance (hereinafter referred to as the depth df of the focal point Fb) between the focal point Fb of the blue optical beam Lb1 and the reflection and transmission film 104.

In this case, the control section 21 (FIG. 7) determines the depth df of the focal point Fb based on address information or the like supplied from the outside, and notifies a depth instruction Idf expressing the depth df to the drive control section 22. The drive control section 22 generates the drive signal DC for driving the collimator lens 53 based on the notified depth instruction Idf and supplies the drive signal DC to the actuator 53A. In this manner, the drive control section 22 moves the collimator lens 53, and consequently adjusts the depth df.

In actuality, the optical pickup 26 adjusts the depth df of the focal point Fb in the blue optical beam Lb1, so that a plurality of layers (hereinafter referred to as the mark recording layer) of the recording mark RM are formed in the recording layer 101, and the recording mark RM can be read from each of the mark recording layers.

As described above, the optical pickup 26 controls a position of the lens 36 so as to make the focal point Fr of the red optical beam Lr1 following the target track in the position control optical system 30. Also, the optical pickup 26 can record and reproduce information by recording the recording mark RM or reproducing a hologram by using the blue optical beam Lb1 in the recording and reproducing optical system 50.

(1-3) Adjustment of Irradiation Position of Blue Optical Beam

Figure 9:
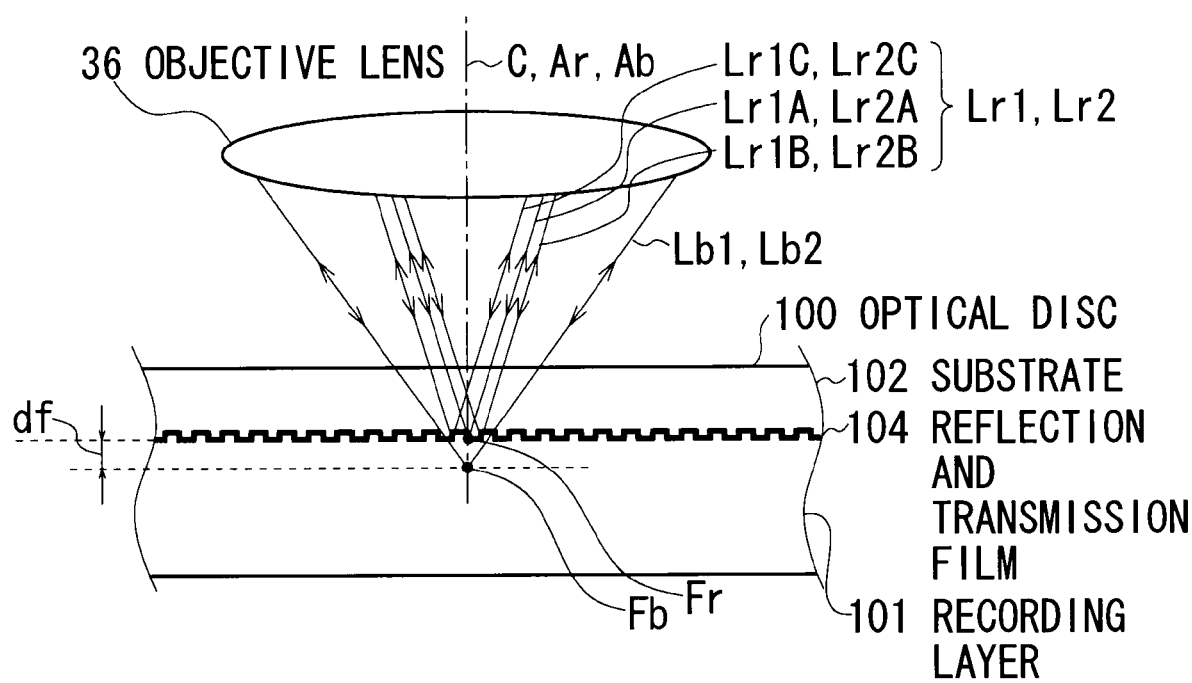
FIG. 9 is a schematic diagram showing an internal configuration of an optical disc.

The optical pickup 26 is designed to be in a reference state in which an optical axis Ab of the blue optical beam Lb1 overlaps with an optical axis Ar of the red optical beam Lr1, and also with the center axis C of the objective lens 36 (hereinafter this state is referred to as the reference state). In this case, as shown in FIG. 9, the focal point Fb is positioned directly below the focal point Fr.

However, as described above, the objective lens 36 of the optical pickup 26 is controlled to move in the tracking direction so as to make the focal point Fr of the red optical beam Lr1 following the target track. Therefore, the objective lens 36 is often displaced (that is, shifted) from the reference state. In such a case, the objective lens 36 disturbs a positional relationship that "the focal point Fb is positioned directly below the focal point Fr", as similar to the case in FIG. 6.

Figure 6:
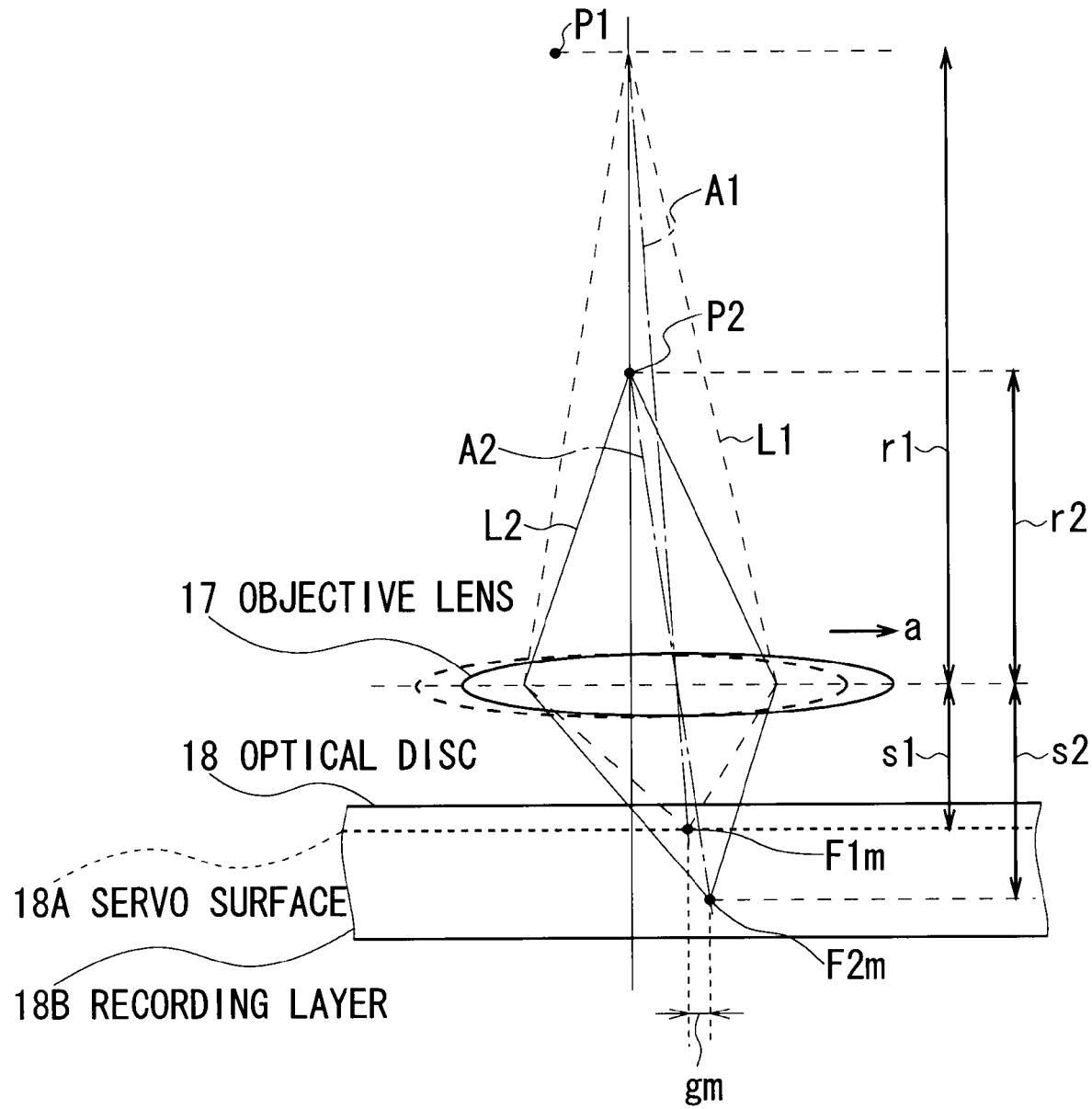
FIG. 6 is a schematic diagram used for description of movement of a converging point due to tracking movement of an objective lens.
Figure 13:
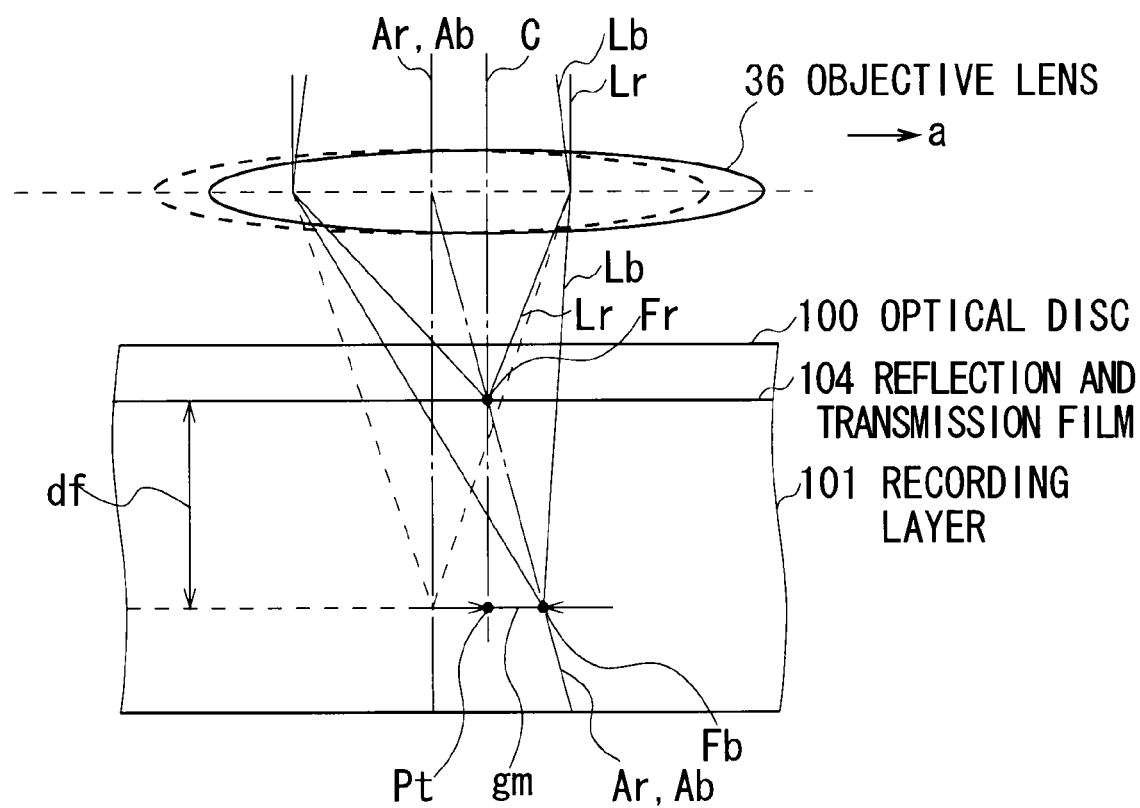
FIG. 13 is a schematic diagram used for description of deviation of a focal point due to shift of an objective lens.

For example, as shown in FIG. 13 which corresponds to FIG. 6, the objective lens 36 is assumed to be moved (shifted) in an arrow a direction from a position (shown by a broken line in FIG. 13) in the reference state by tracking control. At this time, although the objective lens 36 can position the focal point Fr on the center line C with respect to the red optical beam Lr1 that is incident on the objective lens 36 with parallel light, the objective lens 36 displaces the focal point Fb from the center line C with respect to the blue optical beam Lb1 that is incident on the objective lens 36 with diverging light.

In this state, the focal point Fb of the blue optical beam Lb1 is formed at a position away for a deviation amount gm in the tracking direction from an original converging position, that is, a target converging position Pt which is directly below the focal point Fr of the red optical beam Lr1.

In this case, the optical pickup 26 can position the focal point Fb directly below the focal point Fr of the red optical beam Lr1 as long as a position of the focal point Fb can be appropriately adjusted in accordance with a direction of the deviation and the deviation amount gm.

In view of the above, the optical pickup 26 detects the deviation amount gm, and also adjusts a irradiation position (that is, a position of the focal point Fb) of the blue optical beam Lb1 in accordance with the deviation amount gm.

(1-3-1) Principle of Detection of Deviation Amount

In general, as a calculation method of a tracking error signal, in addition to the three-spot method described above, there is known, for example, a so-called push-pull method that uses the detection signals SDA, SDB, SDC, and SDD supplied from the servo photodetector 38 (FIG. 8). The push-pull method calculates a push-pull tracking error signal STEp in accordance with the following formula (5).

$$SETp=(SDA+SDB)-(SDC+SDD) \quad (5)$$

The push-pull tracking error signal STEp calculates a deviation amount (that is, the track deviation amount) between the target track and the focal point Fr of the red optical beam Lr1 with respect to the tracking direction, based on a difference in light amounts between a side of the detection areas 38A and 38B (that is, the upper side of FIG. 11) and a side of the detection areas 38C and 38D (that is, the lower side of FIG. 11).

Figures 14A, 14B:
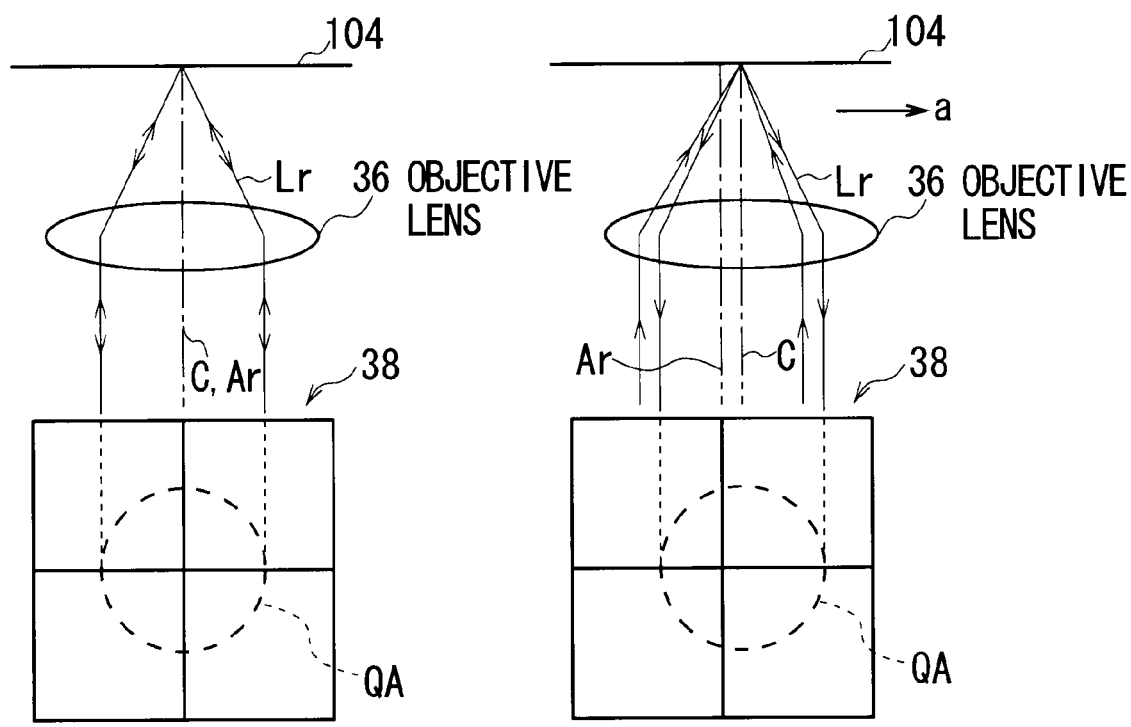
FIGS. 14A and 14B are schematic diagrams used for description of movement of a beam spot due to shift of an objective lens.

However, as shown in FIGS. 14A and 14B, the push-pull tracking error signal STEp has the beam spot QA moving due to movement of the objective lens 36 in the tracking direction. In this case, as obvious from Formula (5), the push-pull tracking error signal STEp is known to have an offset, that is, the push-pull tracking error signal STEp takes a value other than "0" or has a so-called offset, even when the focal point Fr of the red optical beam Lr1 correctly follows the target track.

For the above reason, a value of the push-pull tracking error signal STEp by itself is not sufficient for discriminating whether an offset is included due to movement of the objective lens 36 in the tracking direction, the focal point Fr of the red optical beam Lr1 is shifted from the target track, or both.

On the other hand, the three-spot tracking error signal STE3, in principle, is known to be hardly affected by movement of the objective lens 36 from the reference position in the tracking direction, that is, has almost no offset.

This is because even when the sub spots QB and QC (FIG. 11) move somewhat due to movement of the objective lens 36 in the tracking direction, light amounts of the sub spots can be correctly detected at the detection areas 38E and 38F as long as the sub spots QB and QC are irradiated in the detection areas 38E and 38F. In this manner, the three-spot tracking error signal STE3 can be correctly calculated in accordance with Formula (4).

That is, when signal levels of the push-pull tracking error signal STEp and the three-spot tracking error signal STE3 are obtained and a difference thereof is calculated at the signal processing section 23, a shift amount of the objective lens 36 can be calculated.

(1-3-2) Principle of Adjustment of Deviation Amount

The optical pickup 26 (FIG. 8) can change an angle of the mirror surface 54S of the galvanometer mirror 54 described above. In this case, the galvanometer mirror 54 can change an optical axis of the blue optical beam Lb1 after reflection by adjusting an angle of the mirror surface 54S based on the mirror control signal DM supplied from the drive control section 22 (FIG. 7).

That is, the optical pickup 26 can adjust the focal point FB of the blue optical beam Lb1 to the target converging position Pt by changing the optical axis Ab (FIG. 13) of the blue optical beam Lb1, in a manner adjusting an angle of the mirror surface 54S in accordance with the shift amount described above.

In addition, as understood from FIG. 13, the deviation amount gm between the focal point Fb of the blue optical beam Lb1 and the target converging position Pt changes corresponding to the depth df of the focal point Fb. As described above, the depth df of the focal point Fb is set in accordance with a position of the blue optical beam Lb1 in an optical axis direction of the collimator lens 53 (FIG. 8).

In actuality, the drive control section 22 (FIG. 7) generates the drive signal DC based on the depth information Idf notified from the control section 21 and supplies the drive signal DC to the actuator 53A. For this reason, the signal processing section 23 obtains the depth information Idf from the control section 21 and thus can recognize the depth df.

That is, when the optical pickup 26 uses the push-pull tracking error signal STEp, three-spot tracking error signal STE3, and the depth information Idf to correct an adjusting range of an angle of the mirror surface 54S, a range of change of an optical axis of the blue optical beam Lb1 can be adjusted. In this manner, the deviation amount gm is adjusted in accordance with the depth df, and such a deviation can be properly resolved.

When the above is seen from another perspective, the optical pickup 26 adjusts the focal point Fb of the blue optical beam Lb1 to the target converging position Pt by changing an optical axis of the blue optical beam Lb1 in accordance with both a shift amount and the depth df.

(1-3-3) Resolution of Deviation

In actuality, the signal processing section 23 (FIG. 7) calculates the push-pull tracking error STEp in accordance with Formula (5) based on the detection signals SDA, SDB, SDC, and SDD that are supplied from the servo photodetector 38 of the position control optical system 30, in addition to the three-spot tracking error signal STE3 described above.

In addition, the signal processing section 23 acquires the depth information Idf from the control section 21, uses the depth information Idf and a prescribed depth coefficient j1, and calculates a distance coefficient k1 in accordance with Formula (6) shown below.

$$k1 = j1 \cdot Idf \quad (6)$$

The depth coefficient j1 is calculated in advance at a design stage or the like based on each design value in an optical system of the optical pickup 26. The depth coefficient j1 has a value for reflecting a relationship between the depth df and the deviation amount gm (FIG. 13) on the galvanometer mirror 54.

Next, the signal processing section 23 uses the distance coefficient k1 obtained from Formula (6) to calculate a mirror drive signal DM used for controlling an angle of the mirror surface 54S of the galvanometer mirror 54 in accordance with Formula (7) shown below. Then, the signal processing section 23 supplies the mirror drive signal DM to the drive control section 22.

$$DM = STEp - k1 \cdot STE3 \quad (7)$$

The drive control section 22 carries out an operation, such as amplification of the mirror drive signal DM to a predetermined multiple, and then supplies the mirror drive signal DM to the galvanometer mirror 54 of the optical pickup 26. Accordingly, the galvanometer mirror 54 changes the optical axis Ab of the blue optical beam Lb1.

At a result, the optical pickup 26 can move the focal point Fb of the blue optical beam Lb1 irradiated from the objective lens 36 so as to adjust the focal point Fb to the target converging position Pt (FIG. 13), and in this manner a deviation between the focal point Fb and the target converging position Pt can be resolved.

(1-4) Operation and Advantageous Effect

In the above configuration, the signal processing section 23 of the optical disc device 20 in the first embodiment calculates the three-spot tracking error signal STE3 in accordance with Formula (4) based on the detection signals SDE and SDF supplied from the servo photodetector 38 (FIG. 11) of the optical pickup 26. Then, the signal processing section 23 supplies the three-spot tracking error signal STE3 to the drive control section 22 and allows the drive control section 22 to carry out tracking control.

In addition, the signal processing section 23 calculates the push-pull tracking error signal STEp in accordance with Formula (5) based on the detection signals SDA, SDB, SDC, and SDD, calculates the distance coefficient k1 in accordance with Formula (6) by using the depth information Idf and the depth coefficient j1, and further calculates the mirror drive signal DM by using the push-pull tracking error signal STEp, the three-spot tracking error signal STE3 and the distance coefficient k1. Then, the signal processing section 23 supplies the signal to the drive control section 22, and in this manner the optical axis Ab of the blue optical beam Lb1 is changed and the focal point Fb is adjusted to the target converging position Pt (FIG. 13).

Therefore, the signal processing section 23 of the optical disc device 20 can calculate a shift amount based on the push-pull tracking error signal STEp including an offset amount and the three-spot tracking error signal STE3 which does not include the offset amount. Accordingly, in accordance with the shift amount, the galvanometer mirror 54 can move the focal point Fb of the blue optical beam Lb1.

In the above manner, the optical disc device 20 can adjust the focal point Fb to the target converging position Pt regardless of the shift amount. Therefore, recording accuracy and reproducing accuracy of information with respect to the optical disc 100 can be maintained high.

At this time, the signal processing section 23 can calculate a shift amount based on two types of tracking error signals. Accordingly, in comparison with a case in which, for example, a shift amount is detected by a position sensor being provided separately, a configuration of the optical pickup 26 can be simplified and weight of the optical pickup 26 does not have to be unnecessarily increased.

In addition, the signal processing section 23 uses a push-pull method as a generating method of a tracking error signal that includes an offset amount. Therefore, the signal processing section 23 can use the detection signals SDA, SDB, SDC, and SDD directly, which are used at the time of generating the focus error signal SFE, and a detection area, a detection element, or the like does not need to be provided separately. In this manner, configurations of the optical pickup 26 and the servo photodetector 38 do not need to be complicated.

Further, the signal processing section 23 calculates the distance coefficient k1 based on the depth information Idf. Therefore, the deviation amount gm that changes in accordance with both a shift amount and the depth df can be appropriately resolved (that is, converged to 0). At this time, the signal processing section 23 uses the depth information Idf used for determining a moving amount of the collimator lens 53 to calculate the distance coefficient k1. Therefore, a sensor or the like for recognizing the depth df does not need to be used separately.

Further, the optical pickup 26 changes only the optical axis Ab of the blue optical beam Lb1 by using the galvanometer mirror 54 without changing the red optical beam Lr1. Therefore, this does not influence the red optical beam Lr1 following the target track.

According to the above configuration, the signal processing section 23 of the optical disc device 20 can calculate the mirror drive signal DM corresponding to a shift amount and the depth df of the objective lens 36 in accordance with Formulas (6) and (7), based on the push-pull tracking error signal STEp including an offset amount due to tracking movement of the objective lens 36, the three-spot tracking error signal STE3 which does not include the offset amount, and the depth information Idf. Accordingly, by adjusting the galvanometer mirror 54 based on the mirror drive signal DM, the focal point Fb of the blue optical beam Lb1 can be adjusted to the target converging position Pt.

(2) Second Embodiment

(2-1) Configuration of Optical Disc Device

An optical disc device 120 (FIG. 7) according to the second embodiment has a similar configuration in comparison with the optical disc device 20 according to the first embodiment, except that the optical disc device 120 includes a control section 121, a drive control section 122, a signal processing section 123, and an optical pickup 126, in place of the control section 21, the drive control section 22, the signal processing section 23, and the optical pickup 26, respectively.

That is, the optical disc device 120 controls the optical pickup 126 by using the control section 121 to record information on the target track on the recording layer 101 of the optical disc 100 and reproduce information from the target track, in a similar manner as the optical disc device 20 in the first embodiment.

(2-2) Configuration of Optical Pickup

Figure 15:
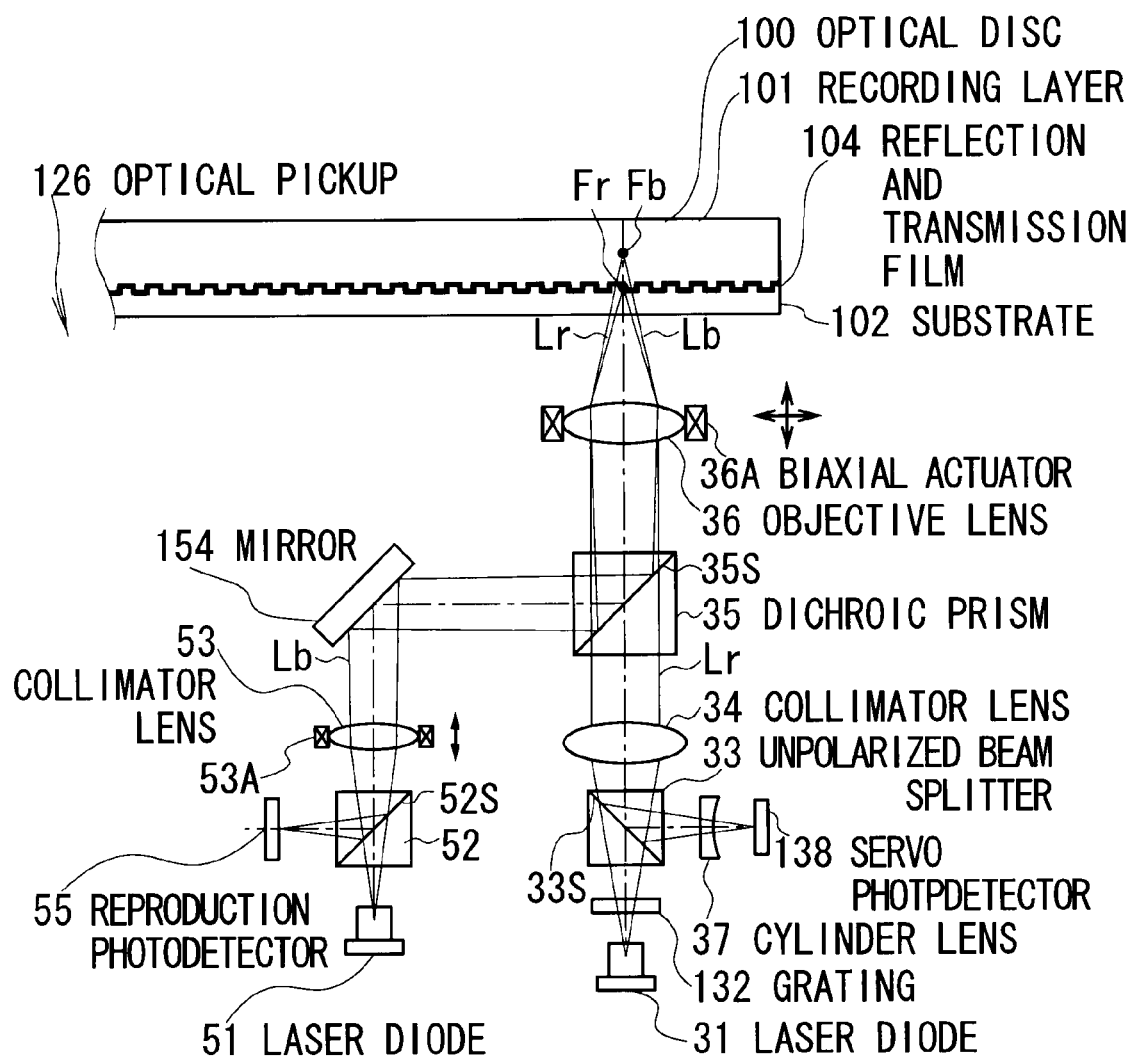
FIG. 15 is a schematic diagram showing a configuration of the optical pickup according to a second embodiment.

As shown in FIG. 15 in which parts corresponding to those in FIG. 8 are assigned with the same numerical numbers, the optical pickup 126 has a similar configuration in comparison with the optical pickup 26, except that the optical pickup 126 includes a grating 132, a servo photodetector 138, and a mirror 154 in place of the grating 32, the servo photodetector 38, and the galvanometer mirror 54, respectively.

The mirror 154 includes a mirror surface which angle is fixed, unlike the galvanometer mirror 54. Therefore, the mirror 154 is configured not to change the optical axis Ab (FIG. 13) of the blue optical beam Lb1.

The grating 132 uses a diffraction angle which is different in comparison with the grating 32 in the first embodiment when dividing the red optical beam Lr1 into the main optical beam Lr1A and the sub optical beams Lr1B and Lr1C by a diffraction effect.

Figure 18:
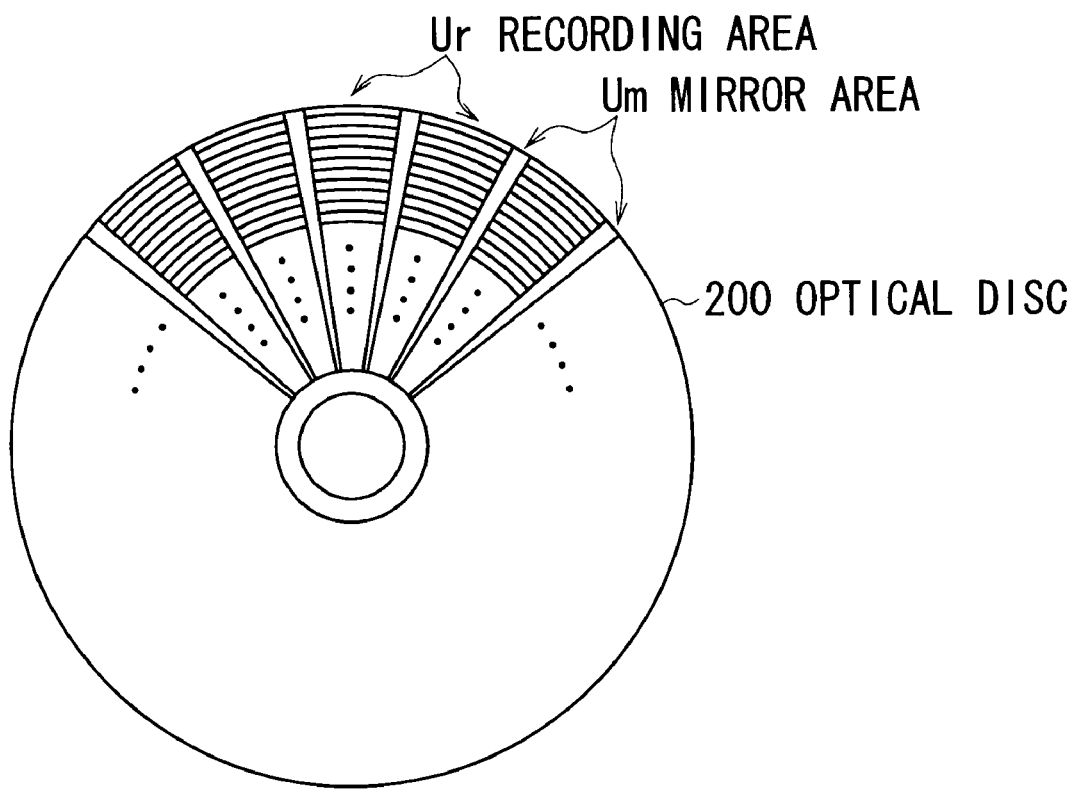
FIG. 18 is a schematic diagram showing a configuration of an optical disc having a mirror area.

That is, as shown in FIG. 18 which corresponds to FIG. 10, the optical pickup 126 forms the beam spots PB and PC on the reflection and transmission film 104 at positions shifted from the beam spot PA to the right and the left for a half track width, instead of a quarter track width, in the tracking direction.

Figure 17:
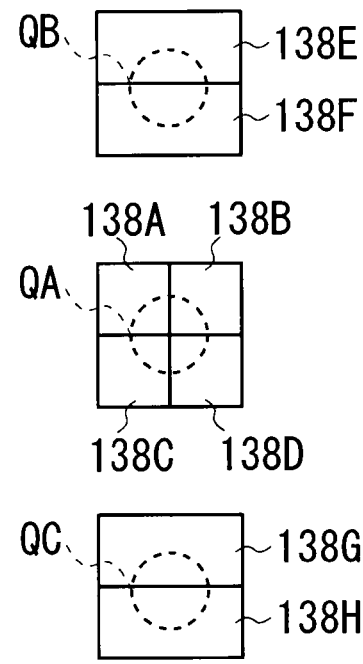
FIG. 17 is a schematic diagram showing a detection area of the servo photo detector according to the second embodiment.

In addition, as shown in FIG. 17 which corresponds to FIG. 11, the servo photodetector 138 includes detection areas 138E, 138F, 138G, and 138H which are seemingly obtained in a manner that each of the detection areas 38E and 38F is divided into two, in addition to detection areas 138A to 138D configured in a similar manner as the detection areas 38A to 38D, respectively.

As similar to the servo photodetector 38, the servo photodetector 138 detects part of the main reflected optical beam Lr2A for each of the detection areas 138A to 138D, and generates the detection signals SDA, SDB, SDC, and SDD, respectively, in accordance with light amounts detected at this time. Then, the servo photodetector 138 sends out such detection signals to the signal processing section 123 (FIG. 7).

In addition, the servo photodetector 138 detects part of the sub reflected optical beam Lr2B for the detection areas 138E and 138F, and also detects part of the sub reflected optical beam Lr2C for the detection areas 138G and 138H. Then, the servo photodetector 138 generates each of detection signals SDE, SDF, SDG, and SDH in accordance with the detected light amount, and sends out the detection signals to the signal processing section 123 (FIG. 7).

As similar to the signal processing section 23, the signal processing section 123 uses a so-called astigmatism method to calculate a focus error signal SFE in accordance with Formula (3), and supplies the focus error signal SFE to the drive control section 122 (FIG. 7).

In addition, as similar to the signal processing section 23, the signal processing section 123 uses the detection signals SDA, SDB, SDC, and SDD to calculate the push-pull tracking error signal STEp in accordance with Formula (5). Then, the signal processing section 123 uses a so-called differential push-pull (DPP) method to calculate a DPP tracking error signal STEd in accordance with the following Formula (8). Then, the signal processing section 123 supplies the DPP tracking error signal STEd to the drive control section 122 (FIG. 7).

$$STEd = STEp - m(SDE - SDF + SDG - SDH) \quad (8)$$

Here, a DPP coefficient m is set in accordance with a ratio between the sum of light amounts of the sub reflected optical beams Lr2B and Lr2C and a light amount of the main reflected optical beam Lr2A. In addition, the DPP tracking error signal STEd is known to include, in principle, almost no offset, as similar to the three-spot tracking error signal STE3 in the first embodiment.

(2-3) Adjustment of Irradiation Position of Blue Optical Beam

The signal processing section 123 is configured to adjust a position of the focal point Fb of the blue optical beam Lb1 as similar to the signal processing section 23, except that the signal processing section 123 is configured to use a method which is partly different from that used by the signal processing section 23 in the first embodiment.

That is, the signal processing section 123 calculates a shift amount and the depth df according to a calculation principle similar to that in the first embodiment. Then, the signal processing section 123 corrects a shift amount of the objective lens 36 so as to converge the deviation amount gm (FIG. 13) to a value "0" based on the calculated shift amount and the depth df.

More specifically, as similar to a case of the distance coefficient k1 in the first embodiment, the signal processing section 123 uses the depth information Idf and a predetermined depth coefficient j2 to calculate a correction coefficient k2 in accordance with Formula (9) shown below.

$$k2 = j2 \cdot Idf \quad (9)$$

The depth coefficient j2 is calculated in advance at a design stage or the like based on each design value in an optical system of the optical pickup 126. The depth coefficient j2 has a value for reflecting a relationship between the depth df and the deviation amount gm (FIG. 13) on the tracking error signal.

Next, the signal processing section 123 generates a correction tracking error signal STEr in accordance with Formula (10) shown below, and supplies the correction tracking error signal STEr to the drive control section 122.

$$STEr = STEp - n \cdot STEd \quad (10)$$

The drive control section 122 generates a tracking control signal DT based on the correction tracking error signal STEr, and supplies the correction tracking error signal STEr to the biaxial actuator 36A of the optical pickup 126. In this manner, the drive control section 122 carries out tracking control of the objective lens 36.

At this time, since the correction tracking error signal STEr is corrected in accordance with the depth df and the shift amount, the drive control section 122 can resolve a deviation between the focal point Fb of the blue optical beam Lb1 and the target converging position Pt.

When the above is seen from another perspective, the optical pickup 126 adjusts the focal point Fb of the blue optical beam Lb1 to the target converging position Pt by changing an optical axis of the blue optical beam Lb1 in accordance with both the shift amount and the depth df, as similar to the first embodiment.

In the optical disc device 120, a moving amount of the objective lens 36 in case tracking control is carried out by decentering or the like of the optical disc 100 (that is, when the target track is followed) is, for example, about 50 μm, whereas a moving amount of the objective lens 36 for converging the deviation amount gm is about 4 to 5 μm. For this reason, in the optical disc device 120, in actuality, the above correction does not influence the original tracking control.

(2-4) Operation and Advantageous Effect

In the above configuration, the signal processing section 123 of the optical disc device 120 according to the second embodiment uses the detection signals SDA, SDB, SDC, and SDD supplied from the servo photodetector 138 (FIG. 17) of the optical pickup 126 to calculate the push-pull tracking error signal STEp in accordance with Formula (5). Then, the signal processing section 123 calculates the DPP tracking error signal STEd in accordance with Formula (8).

In addition, the signal processing section 123 calculates the correction coefficient k2 in accordance with Formula (9), generates the correction tracking error signal STEr in accordance with Formula (10), and then supplies the correction tracking error signal STEr to the drive control section 122. In this manner, the signal processing section 123 changes the optical axis Ab of the blue optical beam Lb1 and adjusts the focal point Fb to the target converging position Pt (FIG. 13).

Therefore, the signal processing section 123 of the optical disc device 120 can calculate a shift amount based on the push-pull tracking error signal STEp including an offset amount and the DPP tracking error signal STEd which does not include the offset amount. Accordingly, by correcting a moving amount in tracking control of the objective lens 36 in accordance with the shift amount, the focal point Fb of the blue optical beam Lb1 can be moved.

In the above manner, as similar to the first embodiment, the optical disc device 120 can adjust the focal point Fb to the target converging position Pt regardless of the shift amount. Therefore, recording accuracy and reproducing accuracy of information with respect to the optical disc 100 can be maintained high.

At this time, as similar to the first embodiment, the signal processing section 123 uses a push-pull method as a generating method of a tracking error signal that includes an offset amount. Therefore, the signal processing section 123 can use the detection signals SDA, SDB, SDC, and SDD directly, which are used at the time of generating the focus error signal SFE and the DPP tracking error signal STEd, and a detection area, a detection element, or the like does not need to be provided separately. In this manner, configurations of the optical pickup 126 and the servo photodetector 138 do not need to be complicated.

Further, the signal processing section 123 calculates the distance coefficient k2 based on the depth information Idf. Therefore, the deviation amount gm that changes in accordance with both a shift amount and the depth df can be appropriately converged. At this time, the signal processing section 123 uses the depth information Idf used for determining a moving amount of the collimator lens 53 to calculate the distance coefficient k2. Therefore, a sensor or the like for recognizing the depth df does not need to be used separately.

In addition, the optical pickup 126 can adjust a position of the focal point Fb of the blue optical beam Lb1 by correcting a moving amount of the objective lens 36 in the tracking control. Therefore, there is no need to provide the galvanometer mirror 54 and control drive of the galvanometer mirror 54 via the drive control section 22 (122), a configuration of the optical pickup 126 can be simplified in comparison with the first embodiment.

According to the above configuration, the signal processing section 123 of the optical disc device 120 can calculate the correction tracking error signal STEr corresponding to a shift amount and the depth df of the objective lens 36 in accordance with Formulas (9) and (10), based on the push-pull tracking error signal STEp including an offset amount due to tracking movement of the objective lens 36, the DPP tracking error signal STEd which does not include the offset amount, and the depth information Idf. Accordingly, by tracking-controlling the objective lens 36 based on the correction tracking error signal STEr, the focal point Fb of the blue optical beam Lb1 can be adjusted to the target converging position Pt.

(3) Other Embodiments

In the embodiments described above, the description has been made with respect to a case in which a tracking error signal which does not include an offset is generated by the three-spot method or the DPP method. However, the present invention is not limited thereto, and the tracking error signal which does not include an offset may be generated by using other methods.

In addition, a tracking error signal including an offset may be generated by a method other than the push-pull method. In short, a shift amount of the objective lens 36 only needs to be calculated based on a tracking error signal which does not include an offset and a tracking error signal which includes an offset.

Figure 16:
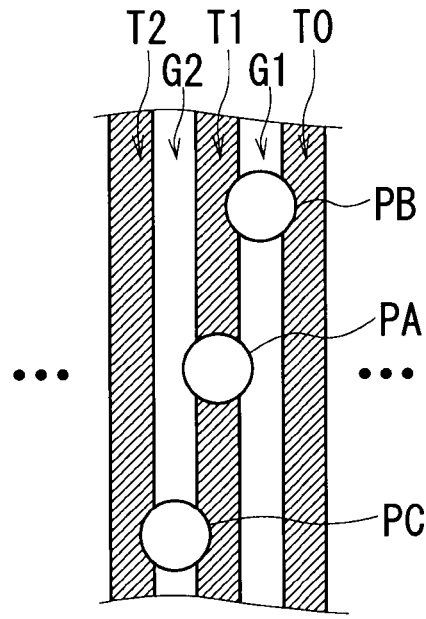
FIG. 16 is a schematic diagram showing a state of a beam spot according to the second embodiment.

Further, as shown in FIG. 18, a tracking error signal may be detected by a method, such as a push-pull method, by appropriately allocating a mirror area Um, which is not provided with a track as shown in FIGS. 10 and 16, for example, in a radial or periodical manner, in addition to a recording area Ur provided with the track, on a signal recording surface of the optical disc.

In this case, the recording area Ur has a tracking error signal including both a track deviation amount and a shift amount, and the mirror area Um has a tracking error signal including a shift amount since the track is not formed thereon. Therefore, the signal processing section 23 or the like can calculate a shift amount based on the tracking error signal in the mirror area Um.

Further, in the embodiments described above, the description was made with respect to a case in which a shift amount of the objective lens 36 is calculated based on two types of tracking error signals. However, the present invention is not limited thereto. For example, a position sensor, a distance sensor, or the like is provided in the optical pickup 26, and a shift amount of the objective lens 36 may be detected by using the position sensor, the distance sensor, or the like.

Further, in the embodiments described above, the description has been made with respect to a case in which the distance coefficients k1 and k2 are changed in accordance with Formulas (6) and (9) in correspondence with the depth df (FIG. 13). However, the present invention is not limited thereto. For example, in case a relationship between the depth df and the distance coefficients k1 and k2 is expressed by another function, the distance coefficients k1 and k2 are calculated by using the another function. Alternatively, in case a corresponding relationship between the depth df and the distance coefficients k1 and k2 is known to be nonlinear, a table is created in advance and is stored in a non-volatile memory or the like, and the distance coefficients k1 and k2 may be determined from the depth df by referring to the table.

Further, in view of optical design of the optical pickups 26 and 126, in case the deviation amount gm does not change much even when a depth of the target converging position Pt changes, the distance coefficients k1 and k2 may be fixed values.

Further, description has been made with respect to a case in which drive of the mirror surface 54S of the galvanometer mirror 54 is controlled in the above described first embodiment and a tracking error signal is corrected to correct a moving amount of the objective lens 36 in the tracking direction in the second embodiment, and in this manner the focal point Fb of the blue optical beam Lb1 is adjusted to the target converging position Pt (FIG. 13). However, the present invention is not limited thereto. The focal point Fb may be adjusted to the target converging position Pt by using a variety of methods, such as changing an optical axis of the blue optical beam Lb1 by shifting the collimator lens 53, in place of the mirror surface 54S of the galvanometer mirror 54, in a direction (for example, a tracking direction) orthogonal to an optical axis of the blue optical beam Lb1 by using the actuator 53A, in the first embodiment.

Figure 4:
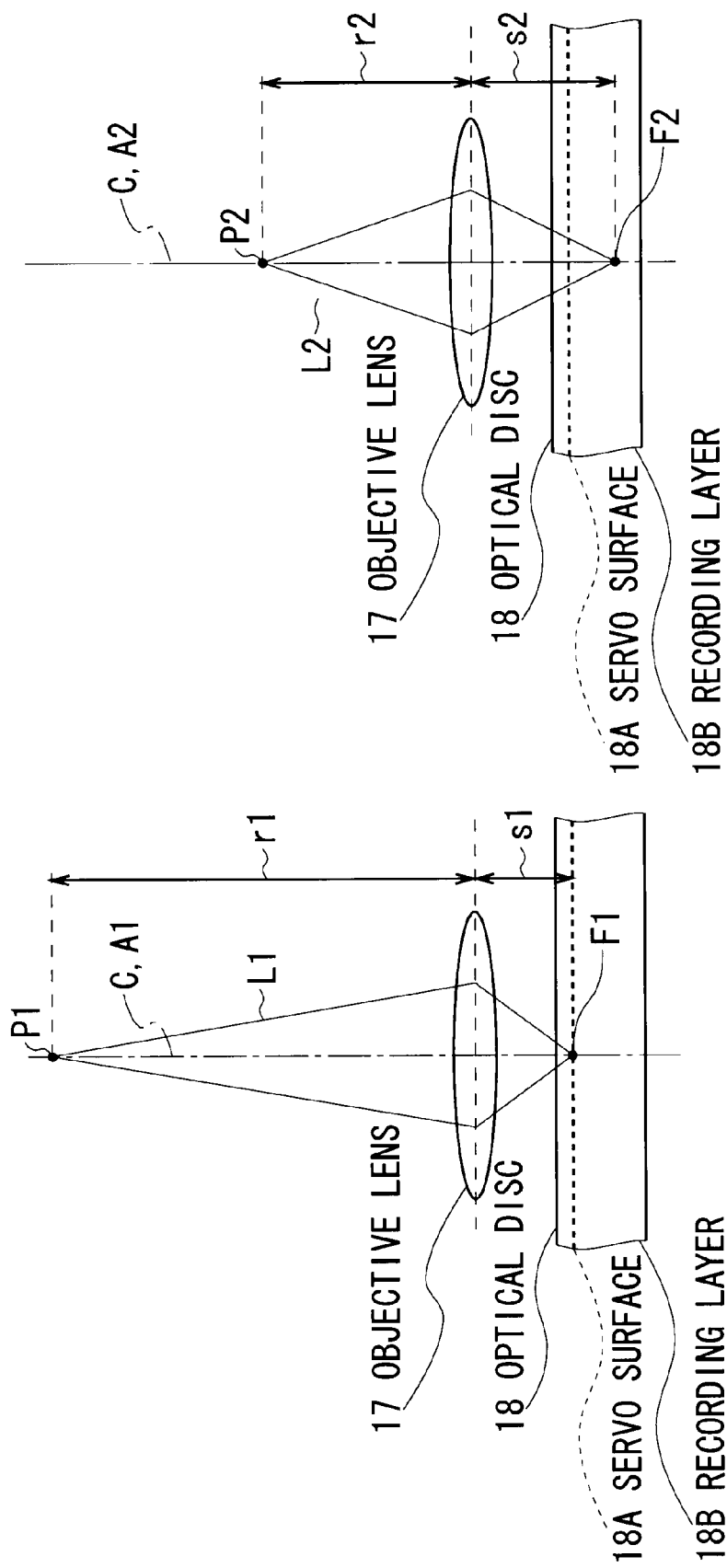
FIGS. 4A and 4B are schematic diagrams used for description of convergence (1) of an optical beam.
Figure 5:
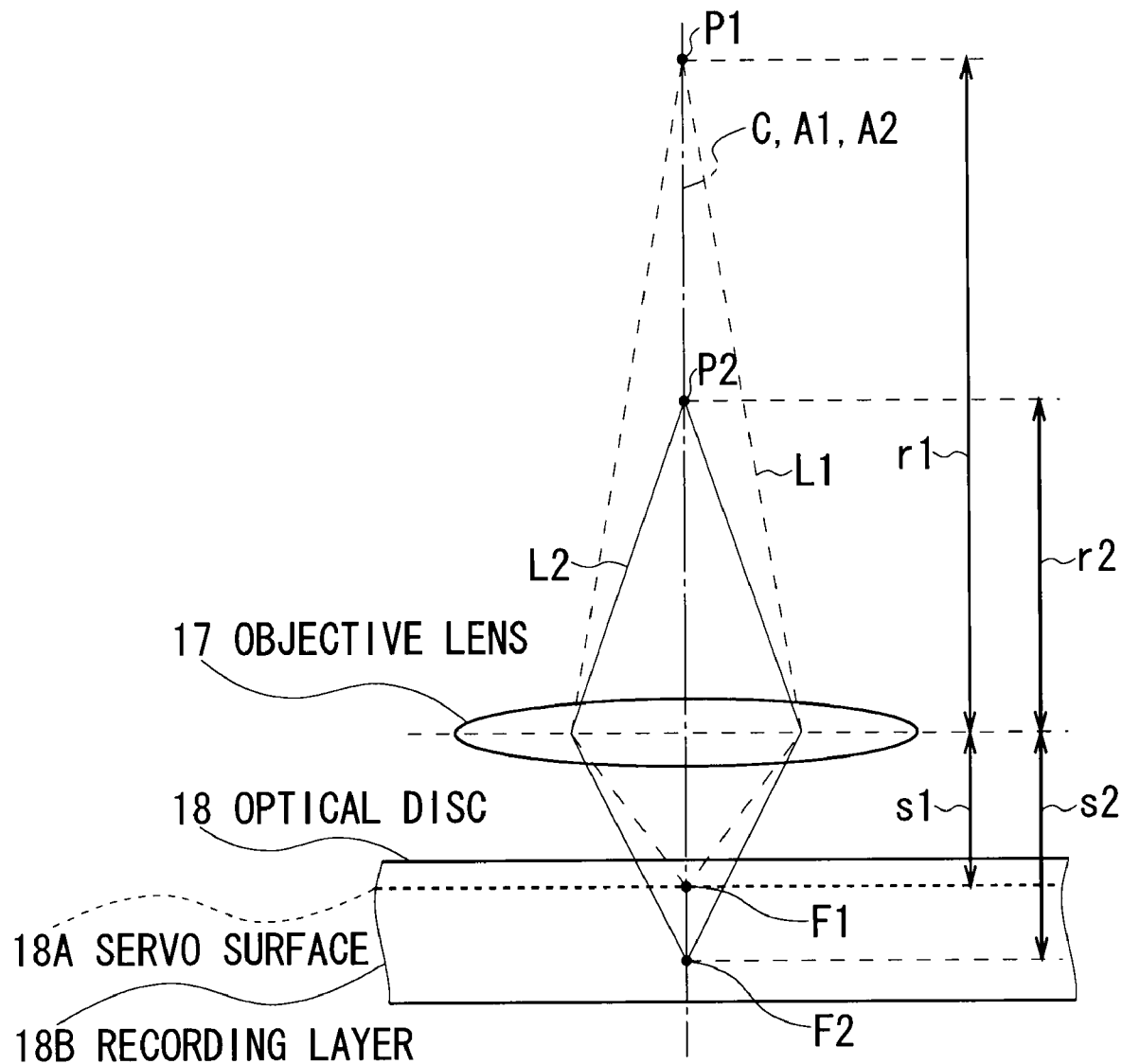
FIG. 5 is a schematic diagram used for description of convergence (2) of an optical beam.

Further, in the embodiments described above, the description has been made with respect to a case in which the red optical beam Lr1 is made incident on the objective lens 36 as parallel light and the blue optical beam Lb1 is made incident on the objective lens 36 as diverging light. However, the present invention is not limited thereto. For example, the configuration may be such that the red optical beam Lr1 is made incident on the objective lens 36 as converging light and the blue optical beam Lb1 is made incident on the objective lens 36 as parallel light. Alternatively, as similar to the case shown in FIGS. 4 to 6, both the red optical beam Lr1 and the blue optical beam Lb1 may be incident on the objective lens 36 as diverging light. In short, diverging angles of the red optical beam Lr1 and the blue optical beam Lb1 need to be adjusted in accordance with a focus distance of the objective lens 36 and an optical design of the optical pickup 26 (126).

In this case, the depth coefficients j1 and j2 and the distance coefficients k1 and k2 are appropriately set in accordance with an optical design or the like of the optical pickup 26 (126).

Further, in the embodiments described above, the description has been made with respect to a case in which a hologram is formed on the recording layer 101 of the optical disc 100 in a uniform manner by a preceding formatting processing, and the blue optical beam Lb1 is converged to locally destroy the hologram in the recording layer 101 so as to record information. However, the present invention is not limited thereto. The recording mark RM may be formed and the information may be reproduced, by using other methods.

Figures 19A, 19B:
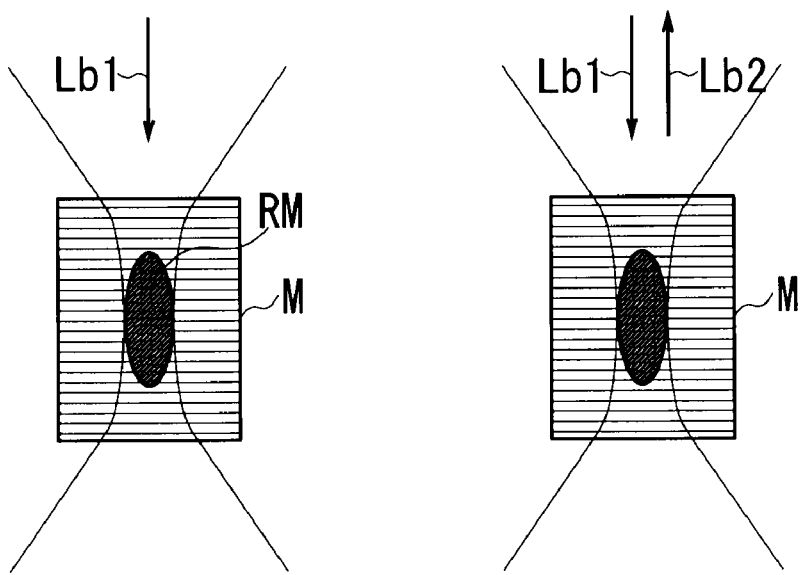
FIGS. 19A and 19B are schematic diagrams used for description of principle of recording and reproduction of information according to another embodiment.

For example, the present invention may be applied to an information recording method in which, as shown in FIG. 19 which corresponds to FIG. 12, an organometallic compound is compounded with a recording layer M and the recording layer M is photo-cured in advance, and the blue optical beam Lb1 is converged on the recording layer M to have a high temperature. In this manner, a metallic compound or pure metal is deposited in the vicinity of the target position, and the recording mark RM having a high reflection coefficient is formed. In this case, the blue optical beam Lb1 which is comparatively low in intensity is converged on the recording mark RM, and the reproduction optical beam Lb2 which is obtained by reflection of the blue optical beam Lb1 is obtained, and information can be reproduced based on the reproduction optical beam Lb2.

Further, in the embodiments described above, the description has been made with respect to a case in which the present invention is applied to the optical disc device 20 of a so-called one-side optical system in which the recording mark RM as information is formed by using one beam of the blue optical beam Lb1 with respect to the optical disc 100, and information is reproduced based on the reproduction optical beam Lb2 obtained by irradiating the one beam of the blue optical beam Lb1 to the optical disc 100. However, the present invention is not limited thereto. For example, the present invention may be applied to an optical disc device of a so-called both-side optical system, in which one beam of a blue optical beam Lb is irradiated from both surfaces of the optical disc 100 to form a hologram so as to form the recording mark RM, and information is reproduced by generating reproduction light by irradiating one beam of the blue optical beam Lb from one side of the optical disc 100 to the recording mark RM.

Further, in the embodiments described above, the description has been made with respect to a case in which the reflection and transmission film 104 is provided on a side closest to the objective lens 36 on the recording layer 101 (FIG. 9). However, the present invention is not limited thereto. For example, the reflection and transmission film 104 may be provided on a side furthest from the objective lens 36 (that is, a lowest part in FIG. 9) on the recording layer 101 or in the inside of the recording layer 101. In short, the reflection and transmission film 104 for a servo only needs to be provided separately from the recording layer 101 on which the recording mark RM is actually recorded. In addition, for example, a concentric track may be formed in place of a spiral track on the reflection and transmission film 104. Alternatively, a pit or the like may be formed in place of a groove structure.

Further, in the embodiments described above, the description has been made with respect to a case in which the optical disc device 20 working as an optical disc device is configured with the objective lens 36 working as an objective lens, the drive control section 22 and the biaxial actuator 36A working as moving sections, and the signal processing section 23 working as a detection section and a correction section. However, the present invention is not limited thereto, and the optical disc device may be configured with an objective lens, a moving section, a detection section, and a correction section having other variety of circuit configurations.

The present invention can be applied to an optical disc device that records and reproduces video data, audio data, and the like having large capacity to and from an optical disc.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disc device comprising:
a light source that irradiates an optical beam to an optical disc including a recording layer for recording information and a positioning layer provided with a track for identifying a recording position of the information on the recording layer,
an objective lens that converges a predetermined positioning optical beam so as to adjust the optical beam to a desired track on the positioning layer, and also converges an information optical beam that shares an optical axis with the positioning optical beam on the recording layer;
a moving section that moves the objective lens in a direction along a radius of the optical disc to make a focal point of the positioning optical beam follow the desired track;
a detection section that detects a moving amount of the objective lens with respect to the direction; and
a correction section that corrects an offset between a converging position of the information optical beam and a converging position of the positioning optical beam due to the moving amount of the objective lens.

2. The optical disc device according to claim 1, wherein the detection section detects the moving amount based on a tracking error signal that expresses a deviation amount between a focal point of the positioning optical beam with respect to the direction and the desired track.

3. The optical disc device according to claim 1, comprising a light receiving section that receives light of a reflected optical beam obtained by the positioning optical beam reflected by the positioning layer, wherein the detection section generates a first tracking error signal including an offset component corresponding to the moving amount with respect to the direction of the objective lens based on a light receiving result of the light receiving section, generates a second tracking error signal in which the offset component is hardly included, and detects the moving amount based on a difference between the first tracking error signal and the second tracking error signal.

4. The optical disc device according to claim 3, wherein the light receiving section has a light receiving area for receiving light of the positioning optical beam divided into a plurality of divided light receiving areas, and the detection section uses a push-pull method that uses a difference between each of light receiving results of the divided light receiving areas to detect the first tracking error signal.

5. The optical disc device according to claim 3, comprising a dispersion element that disperses the positioning optical beam before being irradiated on the optical disc into one main beam and two sub beams, wherein the light receiving section includes a main light receiving area and two sub light receiving areas that receive the main beam and the two sub beams, respectively, and the detection section uses a three-spot method that uses a difference between each of light receiving results of the sub light receiving areas to detect the second tracking error signal.

6. The optical disc device according to claim 3, comprising a dispersion element that disperses the positioning optical beam before being irradiated on the optical disc into one main beam and two sub beams, wherein the light receiving section includes a main light receiving area and two sub light receiving areas that receive the main beam and the two sub beams, respectively, and the detection section uses a three-spot method that uses a difference between each of light receiving results of the sub light receiving areas to detect the second tracking error signal.

7. The optical disc device according to claim 1, wherein the detection section detects the moving amount by using a position sensor or a distance sensor.

8. The optical disc device according to claim 1, wherein the correction section changes an advancing direction of the information optical beam in accordance with the moving amount so as to correct a converging position of the information optical beam.

9. The optical disc device according to claim 8 comprising a galvanometer mirror that reflects the information optical beam by a reflective surface and changes the advancing direction of the information optical beam by adjusting an angle of the reflective surface, wherein the correction section adjusts an angle of the reflective surface on the galvanometer mirror in accordance with the moving amount so as to correct a converging position of the information optical beam.

10. The optical disc device according to claim 1, wherein the correction section adjusts a moving distance of the objective lens in the moving section in accordance with the moving amount so as to correct a converging position of the information optical beam.

11. The optical disc device according to claim 1, wherein the correction section corrects a converging position of the information optical beam based on a distance between the objective lens and the information optical beam and the moving amount.

12. The optical disc device according to claim 1 comprising a galvanometer mirror that reflects the information optical beam by a reflective surface and changes an advancing direction of the information optical beam by adjusting an angle of the reflective surface, wherein the correction section adjusts an angle of the reflective surface on the galvanometer minor in accordance with the moving amount so as to correct a converging position of the information optical beam.

13. A converging position correction method comprising:

irradiating, with a light source, an optical beam to an optical disc including a recording layer for recording information and a positioning layer provided with a track for identifying a recording position of the information on the recording layer, moving an objective lens that converges a predetermined positioning optical beam so as to adjust the optical beam to a desired track on the positioning layer, and also converges an information optical beam that shares an optical axis with the positioning optical beam on the recording layer, in a direction along a radius of the optical disc;

detecting a moving amount of the objective lens with respect to the direction; and correcting an offset between a converging position of the information optical beam and a converging position of the positioning optical beam due to the moving amount of the objective lens so as to make a focal point of the positioning optical beam following the desired track.

* * * * *